(12) United States Patent
Takatsu et al.

(10) Patent No.: US 8,239,398 B2
(45) Date of Patent: Aug. 7, 2012

(54) NOTIFICATION PROCESSOR THAT NOTIFIES INFORMATION AND POSITION INFORMATION MANAGER

(75) Inventors: Kazunori Takatsu, Kanagawa (JP); Takuya Imai, Tokyo (JP); Yukiko Sahashi, Kanagawa (JP); Mototsugu Emori, Saitama (JP)

(73) Assignee: Ricoh Company, Ltd., Tokyo (JE)

( * ) Notice: Subject to any disclaimer, the term of this patent is extended or adjusted under 35 U.S.C. 154(b) by 0 days.

(21) Appl. No.: 13/159,005

(22) Filed: Jun. 13, 2011

(65) Prior Publication Data

US 2011/0276985 A1    Nov. 10, 2011

Related U.S. Application Data

(62) Division of application No. 11/358,428, filed on Feb. 22, 2006, now Pat. No. 7,991,774.

(30) Foreign Application Priority Data

Mar. 9, 2005  (JP) ................................. 2005-066217
Mar. 25, 2005 (JP) ................................. 2005-089435

(51) Int. Cl.
  *G06F 7/00* (2006.01)
(52) U.S. Cl. ...................................................... 707/758
(58) Field of Classification Search .................. None
  See application file for complete search history.

(56) References Cited

U.S. PATENT DOCUMENTS

| | | | |
|---|---|---|---|
| 7,176,957 B2 | 2/2007 | Ivashin et al. | |
| 7,239,278 B2 | 7/2007 | Koiso et al. | |
| 2002/0154010 A1 * | 10/2002 | Tu et al. ........ | 340/517 |
| 2003/0104819 A1 | 6/2003 | Knauerhase et al. | |
| 2004/0166811 A1 | 8/2004 | Moon | |
| 2005/0046577 A1 | 3/2005 | Koiso et al. | |
| 2006/0004800 A1 | 1/2006 | Okamoto et al. | |
| 2008/0147687 A1 | 6/2008 | Furukawa et al. | |

FOREIGN PATENT DOCUMENTS

| | | |
|---|---|---|
| EP | 1126399 | 8/2001 |
| JP | 2001-256448 | 9/2001 |
| JP | 2002-074591 | 3/2002 |
| JP | 2002-315032 | 10/2002 |
| JP | 2003-32721 | 1/2003 |
| JP | 2004-102767 A | 4/2004 |
| JP | 2004-258734 | 9/2004 |
| JP | 2004-312289 A | 11/2004 |
| JP | 2005-031808 | 2/2005 |
| WO | WO 02/03735 A1 | 1/2002 |
| WO | WO 02/063898 A1 | 8/2002 |
| WO | WO 03/051020 | 6/2003 |
| WO | WO 2004/003703 | 1/2004 |

OTHER PUBLICATIONS

Japanese Office Action dated Aug. 10, 2010.
Japanese Office Action dated Dec. 7, 2010.

* cited by examiner

*Primary Examiner* — Truong Vo
(74) *Attorney, Agent, or Firm* — Dickstein Shapiro LLP

(57) ABSTRACT

To provide an apparatus that transmits information, which includes a storage unit that stores notification rule information in which transmission destination information is associated with notification type information, a reception processor that receives predetermined information from a detector that detects a mobile information storage medium attached to an object, a notification information generating unit that obtains information specified by the notification type information in the notification rule information based on the predetermined information, to generate notification information from obtained information, and a notification unit that transmits the notification information to a transmission destination specified by the transmission destination information associated with the notification type information that is used when the notification information is generated.

17 Claims, 25 Drawing Sheets

FIG.3

| READER ID | POSITION OF READER | ADDRESS OF READER | COORDINATE SYSTEM |
|---|---|---|---|
| RD0001 | (10, 10) | aaa.bbb.ccc.100 | FLOOR 1 |
| RD0002 | (10, 20) | aaa.bbb.ccc.101 | FLOOR 1 |
| RD0003 | (20, 20) | aaa.bbb.ccc.102 | FLOOR 1 |
| RD0004 | (30, 30) | aaa.bbb.ccc.103 | FLOOR 1 |
| ⋮ | ⋮ | ⋮ | ⋮ |

FIG.4

| TAG ID | READER ID | SIGNAL STRENGTH | DETECTION TIME |
|---|---|---|---|
| TAGID0001 | RD0001 | 150 | 2004/1/10 15:00:30 |
| TAGID0001 | RD0002 | 120 | 2004/1/10 15:00:28 |
| TAGID0001 | RD0003 | 100 | 2004/1/10 15:00:29 |
| TAGID0001 | RD0004 | 140 | 2004/1/10 13:15:00 |
| TAGID0002 | RD0005 | 160 | 2004/1/10 15:00:29 |
| TAGID0002 | RD0006 | 130 | 2004/1/10 15:00:30 |
| TAGID0003 | RD0001 | 150 | 2004/1/10 15:00:28 |
| ⋮ | ⋮ | ⋮ | ⋮ |

FIG.5

| UID | TYPE OF DEVICE | TAG ID |
|---|---|---|
| ID0001 | ○○○ | TAGID0001 |
| ID0002 | ○○○ | TAGID0002 |
| ID0003 | ××× | TA011 |
| ID0004 | ××× | TA012 |

FIG.6

| UID | COORDINATE SYSTEM | POSITION INFORMATION | DETECTION TIME |
|---|---|---|---|
| ID0001 | FLOOR 1 | (12, 14) | 2004/1/10 15:00:30 |
| ID0002 | FLOOR 2 | (13, 15) | 2004/1/10 15:00:30 |
| ID0003 | FLOOR 1 | (12, 14) | 2004/1/10 15:00:31 |
| ID0004 | FLOOR 2 | (20, 20) | 2004/1/10 13:00:15 |
| ⋮ | ⋮ | ⋮ | ⋮ |

| COORDINATE SYSTEM | POSITION 1 | POSITION 2 | LABEL |
|---|---|---|---|
| FLOOR 2 | 10, 10 | 20, 20 | MEETING ROOM |
| FLOOR 2 | 20, 20 | 40, 30 | LABORATORY |
| FLOOR 2 | 20, 20 | 60, 40 | FIRST DIVISION |
| FLOOR 2 | 50, 10 | 50, 20 | FIRST DIVISION |

ENTIRE FLOOR 2

| UID | NAME | TYPE |
|---|---|---|
| ID0001 | TARO TOKKYO | PERSON,ENGINEER,NETWORK |
| ID0002 | HANAKO SHOHYO | PERSON,OFFICEWORK |
| ID0003 | TARO'S CELL PHONE | OBJ,TEL |
| ID0004 | HANAKO'S PDA | OBJ,PDA, |
| ⋮ | ⋮ | ⋮ |

FIG.9

| NO | EVENT | FILTER TYPE | UID | LABEL | CO-ORDINATE SYSTEM | POSITION | SERVICE TYPE | CRYPTO-GRAPHY | TRANSMISSION DESTINATION | TRANSMISSION INFORMATION |
|---|---|---|---|---|---|---|---|---|---|---|
| 1 | COORDINATE CHANGE/UPDATE | PERSON | | | | | HTTP-GET | HTTPS | 192.168.0.10/per.cgi | UID |
| 2 | COORDINATE CHANGE/UPDATE | PERSON | ID0002 | | | | HTTP-GET | | 192.168.0.5/chg.cgi | UID |
| 3 | COORDINATE CHANGE/UPDATE | PERSON | | MEET-ING ROOM | | | SOAP | | 192.168.1.01 | UID, POSITION, TIME |
| 4 | VOLTAGE REDUCTION | | | | | | HTTP-GET | | 192.168.0.30/bat.php | UID |
| 5 | COORDINATE CHANGE/UPDATE | OBJ | | | FLOOR 2 | 20-40, 20-30 | HTTP-GET | | 192.168.10.10/obj.php | UID |

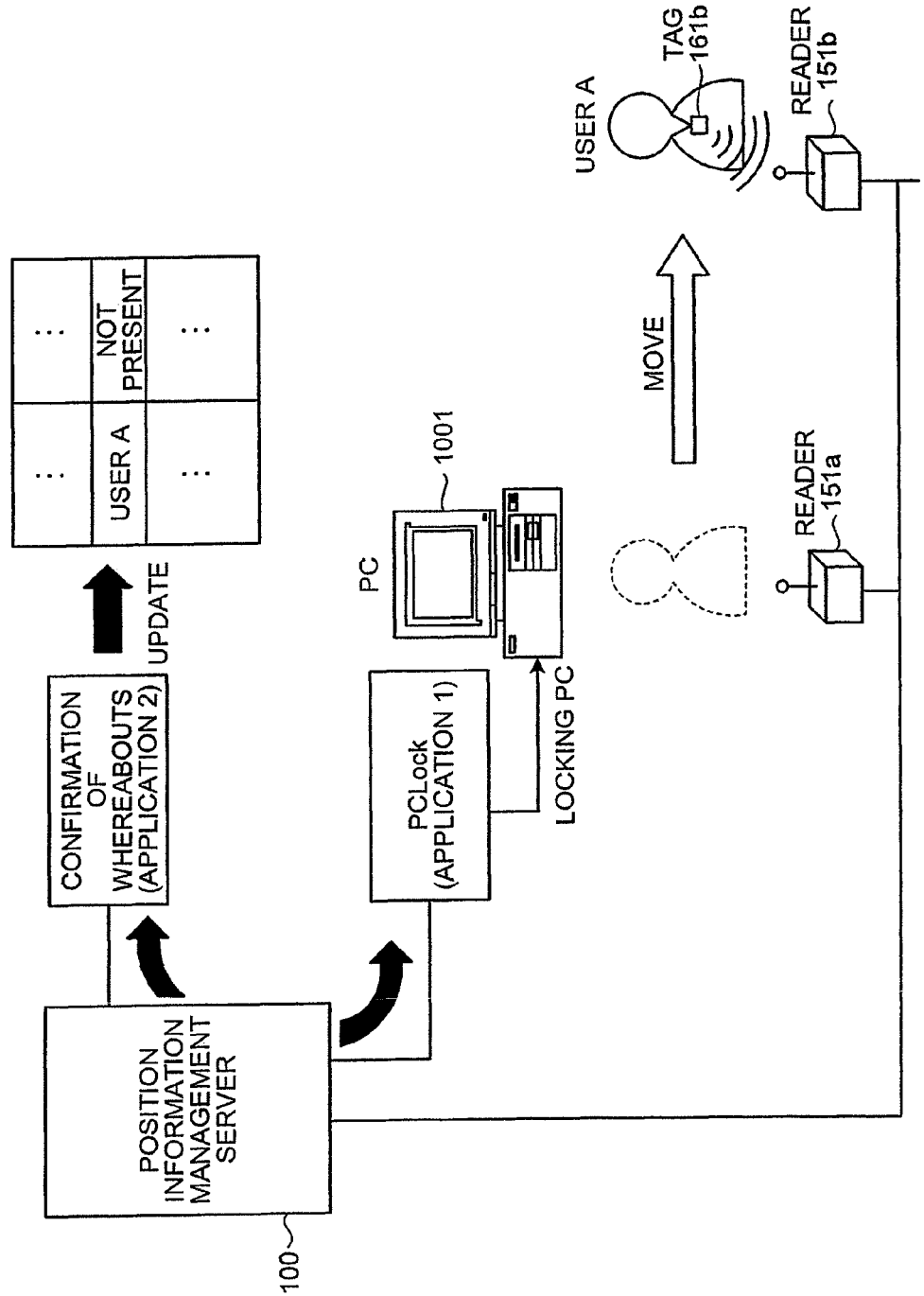

FIG.17

| READER ID | POSITION OF READER | ADDRESS OF READER |
|---|---|---|
| RD0001 | (10, 10) | aaa.bbb.ccc.100 |
| RD0002 | (10, 20) | aaa.bbb.ccc.101 |
| RD0003 | (20, 20) | aaa.bbb.ccc.102 |
| RD0004 | (30, 30) | aaa.bbb.ccc.103 |
| ⋮ | ⋮ | ⋮ |

FIG.18

| ID | READER ID | SIGNAL STRENGTH | DETECTION TIME |
|---|---|---|---|
| ID0001 | RD0001 | 150 | 2004/1/10 15:00:30 |
| ID0001 | RD0002 | 120 | 2004/1/10 15:00:28 |
| ID0001 | RD0003 | 100 | 2004/1/10 15:00:29 |
| ID0001 | RD0004 | 140 | 2004/1/10 13:15:00 |
| ID0002 | RD0005 | 160 | 2004/1/10 15:00:29 |
| ID0002 | RD0006 | 130 | 2004/1/10 15:00:30 |
| ID0003 | RD0001 | 150 | 2004/1/10 15:00:28 |
| ⋮ | ⋮ | ⋮ | ⋮ |

FIG.19

| ID | POSITION OF READER | DETECTION TIME |
|---|---|---|
| ID0001 | (12, 14) | 2004/1/10 15:00:30 |
| ID0002 | (13, 15) | 2004/1/10 15:00:30 |
| ID0003 | (12, 14) | 2004/1/10 15:00:31 |
| ID0004 | (20, 20) | 2004/1/10 13:00:15 |
| ⋮ | ⋮ | ⋮ |

FIG.20

| EVENT | EVENT GENERATION CONDITION |
|---|---|
| DETECTED | WHEN POSITION INFORMATION OF TAG HAS BEEN OBTAINED |
| UNDETECTED | WHEN POSITION INFORMATION OF TAG CANNOT BE OBTAINED |
| POS_UPDATE | WHEN POSITION INFORMATION OF TAG IS UPDATED |
| POS_CHANGE | WHEN POSITION INFORMATION OF TAG CHANGES |
| TIME_CYCLE | OCCURS PERIODICALLY |

FIG.21

| EVENT NAME | TRIGGER EVENT | EVENT GENERATION CONDITION | ARGUMENT | TRANSMISSION DATA | TERM OF VALIDITY | EFFECTIVE FLAG |
|---|---|---|---|---|---|---|
| PRESENT | DETECTED | WHEN IT IS DETECTED AT SPECIFIED POSITION | ID001, (10, 30) | ID, POSITION, TIME | 2005/03/03 | 1 |
| PRESENT | DETECTED | WHEN IT IS DETECTED AT SPECIFIED POSITION | ID002, (10, 30) | ID, POSITION, TIME | 2005/03/03 | 1 |
| ABSENT | UNDETECTED | WHEN IT IS NOT DETECTED AT SPECIFIED POSITION | ID001, (30, 40) | ID, POSITION, TIME | 2005/03/03 | 1 |
| PRESENT_AREA | DETECTED | WHEN IT IS DETECTED AT SPECIFIED AREA | ID001, MEETING ROOM 1 | ID, AREA, TIME | 2005/03/03 | 1 |
| ABSENT_AREA | UNDETECTED | WHEN IT IS NOT DETECTED AT SPECIFIED AREA | ID001, MEETING ROOM 1 | ID, AREA, TIME | 2005/03/03 | 1 |
| CLOSE | POS_UPDATE | WHEN THERE IS A PLURALITY OF TAGS NEARBY | (TAG) 4, (NEIGHBORING RADIUS) 3m | IDxn, POSITION, TIME | 2005/03/03 | 1 |
| STAY | PRESENT, LASTING | LASTING (PRESENT) | ID001, 10 MINUTE | ID, PLACE, STARTING TIME, DURATION | 2005/03/03 | 1 |
| LEAVE | ABSENT_AREA | EV_CHANGE (PRESENT_AREA, ABSENT_AREA) | , RECEPTION ROOM | ID, AREA, TIME | 2005/03/03 | 1 |
| AWAY_AREA | ABSENT_AREA, LASTING | LASTING (ABSENT_AREA) | ID001, 10 MINUTE | ID, AREA, STARTING TIME, DURATION | 2005/03/03 | 1 |
| MOVING | POS_CHANGE, LASTING | LASTING (POS_CHANGE) | ID001, 10 MINUTE | ID, PLACE, STARTING TIME, DURATION | 2005/02/01 | 0 |
| STAY_AREA | PRESENT_AREA, LASING | LASTING (PRESENT_AREA) | ID001, 10 MINUTE | ID, AREA, STARTING TIME, DURATION | 2005/02/01 | 1 |
| ... | ... | ... | ... | ... | ... | ... |

FIG.22

| EVENT NAME | TRIGGER EVENT | EVENT GENERATION CONDITION | ARGUMENT | TRANSMISSION DATA | TERM OF VALIDITY | EFFECTIVE FLAG |
|---|---|---|---|---|---|---|
| PRESENT | DETECTED | WHEN IT IS DETECTED AT SPECIFIED POSITION | ID, POSITION | ID, POSITION, TIME | TIME | 1/0 |
| ABSENT | UNDETECTED | WHEN IT IS NOT DETECTED AT SPECIFIED POSITION | ID, POSITION | ID, POSITION, TIME | TIME | 1/0 |
| PRESENT_AREA | DETECTED | WHEN IT IS DETECTED AT SPECIFIED AREA | ID, AREA | ID, AREA, TIME | TIME | 1/0 |
| ABSENT_AREA | UNDETECTED | WHEN IT IS NOT DETECTED AT SPECIFIED AREA | ID, AREA | ID, AREA, TIME | TIME | 1/0 |
| COME | POS_CHANGE | EV_CHANGE (ABSENT, PRESENT) | ID | ID, POSITION, TIME | TIME | 1/0 |
| GO | POS_CHANGE | EV_CHANGE (PRESENT, ABSENT) | ID | ID, POSITION, TIME | TIME | 1/0 |
| CLOSE | POS_UPDATE | WHEN THERE IS A PLURALITY OF TAGS NEARBY | NUMBER OF TAGS (>1), NEIGHBORING RADIUS | IDxn, POSITION, TIME | TIME | 1/0 |
| LASTING | POS_UPDATE | WHEN SPECIFIED EVENT CONTINUES FOR SPECIFIED PERIOD OR MORE | EVENT, TIME | EVENT, STARTING TIME, DURATION | TIME | 1/0 |
| EV_CHANGE | POS_UPDATE | WHEN THERE IS CHANGE OF EVENT | EVENT 1 (BEFORE CHANGE) EVENT 2 (AFTER CHANGE) | EVENT2, TIME | TIME | 1/0 |
| STAY | PRESENT, LASTING | LASTING (PRESENT) | ID, TIME | ID, PLACE, STARTING TIME, DURATION | TIME | 1/0 |
| AWAY | ABSENT, LASTING | LASTING (ABSENT) | ID, TIME | ID, PLACE, STARTING TIME, DURATION | TIME | 1/0 |
| STAY_AREA | PRESENT_AREA, LASTING | LASTING (PRESENT_AREA) | ID, TIME | ID, AREA, STARTING TIME, DURATION | TIME | 1/0 |
| AWAY_AREA | ABSENT_AREA, LASTING | LASTING (ABSENT_AREA) | ID, TIME | ID, AREA, STARTING TIME, DURATION | TIME | 1/0 |
| MOVING | POS_CHANGE,LASTING | LASTING (POS_CHANGE) | ID, TIME | ID,POSITION, STARTING TIME, DURATION | TIME | 1/0 |
| ENTER | PRESENT_AREA | EV_CHANGE (ABSENT_AREA, PRESENT_AREA) | ID, AREA | ID, AREA, TIME | TIME | 1/0 |
| LEAVE | ABSENT_AREA | EV_CHANGE (PRESENT_AREA, ABESENT_AREA) | ID, AREA | ID, AREA, TIME | TIME | 1/0 |
| MEET | CLOSE | LASTING (CLOSE) | TIME | IDxn, POSITION, STARTING TIME, DURATION | TIME | 1/0 |
| MEETING | STAY AND MEET | STAY_AREA AND MEET | TIME | IDxn, AREA, STARTING TIME, DURATION | TIME | 1/0 |

FIG.23

| TIME | OCCURRED EVENT |
|---|---|
| 10:00:00 | POS_UPDATE, DETECTED, PRESENT_AREA |
| 09:59:59 | POS_UPDATE , DETECTED, PRESENT_AREA |
| 09:59:58 | POS_UPDATE , DETECTED , PRESENT_AREA |
| : | : |
| 09:50:01 | POS_UPDATE , DETECTED , PRESENT_AREA |
| 09:50:00 | POS_UPDATE , POS_CHANGE, DETECTED, PRESENT_AREA |

FIG.24

| AREA NAME | POSITION |
|---|---|
| MEETING ROOM 1 | RECTANGULAR AREA ( $x, y$ ) = (0, 0), (WIDTH, LENGTH) = (20, 20) |
| MEETING ROOM 2 | RECTANGULAR AREA ( $x, y$ ) = (20, 20), (WIDTH, LENGTH) = (10, 10) |
| MEETING ROOM | RECTANGULAR AREA ( $x, y$ ) = (0, 0), (WIDTH, LENGTH) = (20, 20) AND RECTANGULAR AREA ( $x, y$ ) = (20, 20), (WIDTH, LENGTH) = (10, 10) |
| RECEPTION ROOM | RECTANGULAR AREA ( $x, y$ ) = (30, 30), (WIDTH, LENGTH) = (10, 10) |
| SERVER ROOM | RECTANGULAR AREA ( $x, y$ ) = (50, 50), (WIDTH, LENGTH) = (20, 20) |

FIG.25

| NO | EVENT | FILTER TYPE | ID | POSITION | SERVICE TYPE | CRYPTO-GRAPHY | TRANSMISSION DESTINATION | TRANSMISSION INFORMATION |
|---|---|---|---|---|---|---|---|---|
| 1 | PRESENT | PERSON | | | HTTP-GET | HTTPS | 192.168.0.10/per.cgi | ID |
| 2 | PRESENT | PERSON | ID0002 | | HTTP-GET | | 192.168.0.5/per.cgi | ID |
| 3 | LEAVE | PERSON | | | SOAP | | 192.168.1.01 | ID, TIME |
| 4 | CLOSE | | | | HTTP-GET | | 192.168.0.30/bat.php | ID |
| 5 | STAY | OBJ | | | HTTP-GET | | 192.168.10.10/obj.php | ID |
| ... | ... | ... | ... | ... | ... | ... | ... | ... |

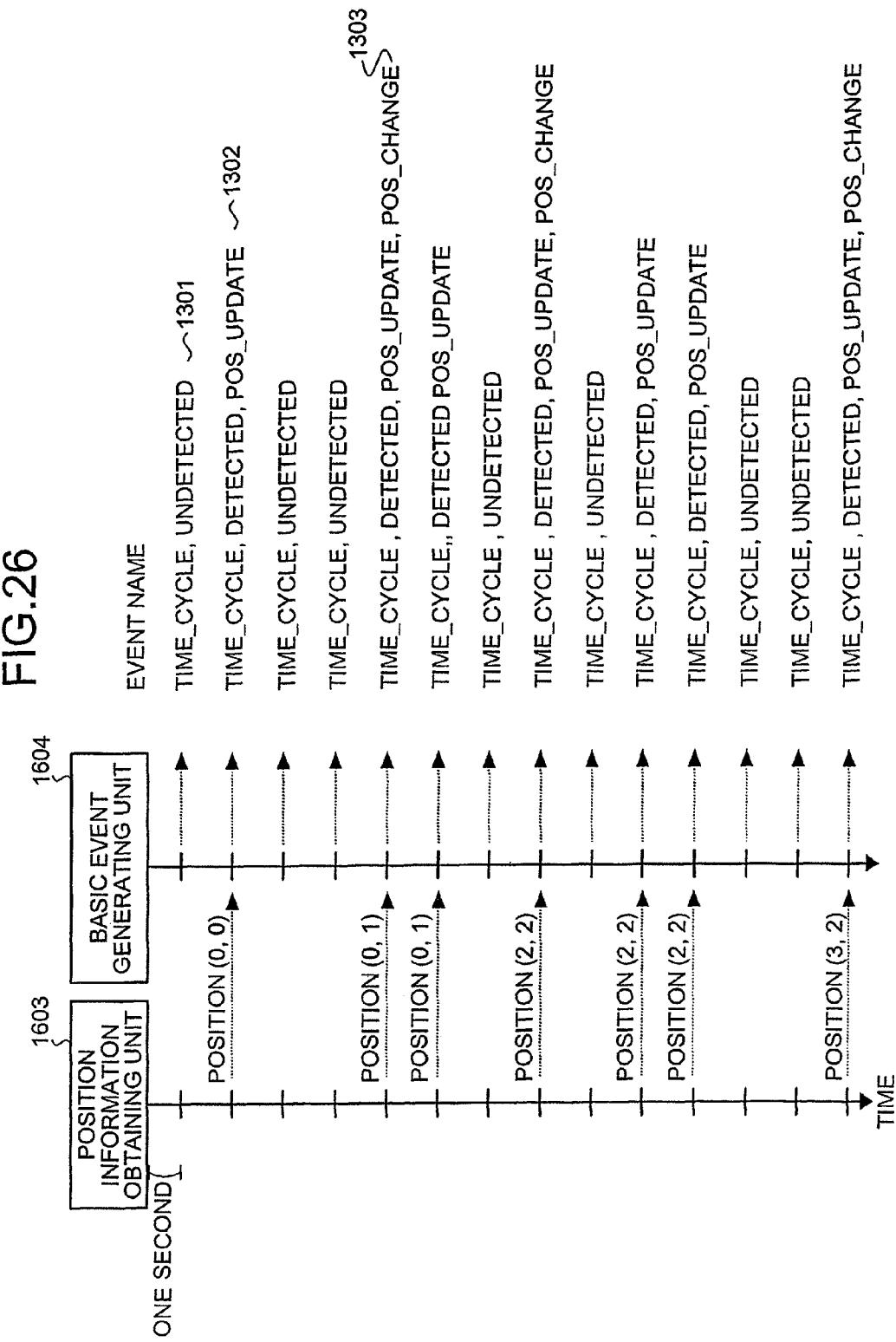

FIG.27

| TIME | OCCURRED EVENT |
|---|---|
| 10:00:00 | POS_UPDATE, DETECTED, PRESENT_AREA, STAY_AREA |
| 09:59:59 | POS_UPDATE , DETECTED, PRESENT_AREA |
| 09:59:58 | POS_UPDATE , DETECTED , PRESENT_AREA |
| : | : |
| 09:50:01 | POS_UPDATE , DETECTED , PRESENT_AREA |
| 09:50:00 | POS_UPDATE , POS_CHANGE, DETECTED, PRESENT_AREA |

FIG.28

| TIME | OCCURRED EVENT |
|---|---|
| 10:00:05 | POS_UPDATE, ABSENT_AREA |
| 10:00:04 | POS_UPDATE , ABSENT_AREA   LEAVE |
| 10:00:03 | POS_UPDATE , PRESENT_AREA |
| 10:00:02 | POS_UPDATE, PRESENT_AREA |
| 10:00:01 | POS_UPDATE , PRESENT_AREA |
| 10:00:00 | POS_UPDATE , PRESENT_AREA |

NOTIFICATION PROCESSOR THAT NOTIFIES INFORMATION AND POSITION INFORMATION MANAGER

CROSS-REFERENCE TO RELATED APPLICATIONS

The present application is a divisional of U.S. application Ser. No. 11/358,428, filed on Feb. 22, 2006 now U.S. Pat. No. 7,991,774, which claims priority to Japanese Patent Application No. 2005-066217, filed Mar. 9, 2005, and Japanese Patent Application No. 2005-089435, filed Mar. 25, 2005, the entire contents of which are incorporated herein by reference.

BACKGROUND OF THE INVENTION

1. Field of the Invention

The present invention relates to a notification processor that notifies input information to processes or applications, a notification processing method, a position information manager, a position information management method, a position information management system, and a computer program product.

2. Description of the Related Art

In recent years, information network technologies have been remarkably developed. Various devices are connected to a network constructed under various environments such as cooperate offices, and the devices can execute various applications. Therefore, many applications for performing processing based on information input via a network have been developed as well.

There is a technique for, when a defined condition is satisfied, transmitting information to applications via a network with the assumption that an event has occurred, and the information is provided to devices connected to the network (for example, see Japanese Patent Application Laid-open (JP-A) No. 2003-32721).

In the technique described in JP-A No. 2003-32721, when a trigger that notifies the event is received, and when a standard described in a profile that matches or correlates with the event is satisfied, this information is notified by the method defined in the profile.

However, in the technique described in JP-A No. 2003-32721, any specific description is not given regarding the condition described in the profile, and a complicated condition cannot be set as the condition to be notified.

On the other hand, to utilize information by various applications, a technique for obtaining pieces of information from a plurality of terminal devices such as a radio tag and a personal handyphone system (PHS), and for collectively processing the pieces of information has been proposed. By managing information of positions collectively, various applications can utilize the information of positions easily (for example, see JP-A No. 2002-315032).

In the invention described in JP-A No. 2002-315032, an application server requests transmission of position information to a position information processing server, and the position information processing server transmits the position information of a terminal device. Accordingly, the application server can obtain the position information. However, in the invention described in JP-A No. 2002-315032, the position information processing server only manages the position information collectively. That is, even the information can be used commonly by a plurality of applications, each of the applications independently needs to obtain necessary information from the position information processing server.

Accordingly, in the inventions described in JP-A Nos. 2003-32721 and 2002-315032, there is a problem that devices, applications, and processes cannot obtain information effectively.

SUMMARY OF THE INVENTION

It is an object of the present invention to at least solve the problems in the conventional technology.

According to one aspect of the present invention, a position information manager that manages position information of an object that can be specified by detecting a mobile information storage medium attached to the object by a detector is constructed such that it includes: a storage unit that stores notification rule information in which transmission destination information to at least one of an application and a process is associated with notification type information indicating a type of information to be notified to one of the corresponding application and the process; a reception processor that receives predetermined information from the detector; a notification information generating unit that obtains one or a plurality of pieces of information specified by the notification type information in the notification rule information based on the predetermined information, to generate notification information from the thus obtained information; and a notification unit that transmits the notification information to a transmission destination specified by the transmission destination information associated with the notification type information that is used when the notification information is generated.

According to another aspect of the present invention, a position information manager that manages position information of an object that can be specified by detecting a mobile information storage medium attached to the object by a detector is constructed such that it includes: a storage unit that stores event correspondence information in which event generation condition information predetermined as a condition for determining that an event to be detected has occurred is associated with target event information, which is event information indicating information that the event has occurred, and is used when the event generation condition information is specified; a reception processor that receives predetermined information from the detector that has detected the mobile information storage medium; a first event generating unit that generates first event information, when having determined that information obtained from the predetermined information matches with basic generation condition information predetermined as a condition indicating that an easily detectable event has been detected; a second event generating unit that generates second event information, when having determined that information obtained based on the first event information matches with the event generation condition information specified based on the first event information generated by the first event generating unit and the target event information in the event generation correspondence information; and a notification processing unit that transmits notification based on the second event information generated by the second event generating unit.

According to still another aspect of the present invention, a method of managing position information of an object that can be specified by detecting a mobile information storage medium attached to the object by a detector includes the functions contained in the above-mentioned position information manager.

According to still another aspect of the present invention, a notification processor is constructed such that it includes: a storage unit that stores event correspondence information in which event generation condition information predetermined as a condition for determining that an event to be detected has occurred is associated with target event information, which is event information indicating that the event has occurred, and is used when the event generation condition information is specified; a first event generating unit that generates first event information, when having determined that input information matches with basic generation condition information predetermined as a condition indicating that an easily detectable event has been detected; a second event generating unit that generates second event information, when having determined that information obtained based on the first event information matches with the event generation condition information specified based on the first event information and the target event information in the event generation correspondence information; and a notification processing unit that transmits notification based on the second event information.

According to still another aspect of the present invention, a notification method includes: generating first event information, when having determined that input information matches with basic generation condition information predetermined as a condition indicating that an easily detectable event has been detected; generating second event information, when having determined that information obtained based on the first event information matches with event generation condition information specified based on the first event information and target event information in event generation correspondence information, in which the event generation condition information predetermined as a condition for determining that an event to be detected has occurred, and the target event information, which is event information indicating that an event has occurred and is used when the event generation condition information is specified, are stored in a storage unit in association with each other; and a notifying by transmitting notification based on the second event information.

According to still another aspect of the present invention, a computer-readable recording medium that stores therein a computer program is constructed such that it includes various commands that causes a computer to execute: processing for receiving predetermined information from a detector that has detected a mobile information storage medium attached to an object; generating notification information for obtaining one or a plurality of pieces of information specified by the notification type information in notification rule information, in which transmission destination information to an application or a process is associated with the notification type information indicating a type of information to be notified to the application or the process, based on the predetermined information, to generate notification information from obtained information; and notifying by transmitting the notification information to a transmission destination specified by the transmission destination information associated with the notification type information that is used when the notification information is generated.

According to still another aspect of the present invention, a computer-readable recording medium that stores therein a computer program is constructed such that it includes various commands that causes a computer to execute: generating first event information, when having determined that input information matches with basic generation condition information predetermined as a condition indicating that an easily detectable event has been detected; generating second event information, when having determined that information obtained based on the first event information matches with event generation condition information specified based on the first event information and target event information in event generation correspondence information, in which the event generation condition information predetermined as a condition for determining that an event to be detected has occurred, and the target event information, which is event information indicating that an event has occurred and is used when the event generation condition information is specified, are stored in a storage unit in association with each other; and a notifying by transmitting notification based on the second event information.

According to still another aspect of the present invention, a position information management system having a mobile information storage medium attached to an object present in a section, from which position information is to be obtained, a detector that detects the mobile information storage medium in a non-contact manner with the mobile information storage medium, and a position information manager that manages the position information of detected object attached with the mobile information storage medium includes the above-explained position information manager According to still another aspect of the present invention, a position information management system having a mobile information storage medium attached to an object present in a section, from which position information is to be obtained, a detector that detects the mobile information storage medium in a non-contact manner with the mobile information storage medium, and a position information manager that manages position information of a detected object attached with the mobile information storage medium, includes the above-explained position information manager The other objects, features, and advantages of the present invention are specifically set forth in or will become apparent from the following detailed description of the invention when read in conjunction with the accompanying drawings.

BRIEF DESCRIPTION OF THE DRAWINGS

FIG. 3 is a structural diagram of a reader position management table stored in a storage unit in a position information management server according to the first embodiment;

FIG. 4 is a structural diagram of a tag signal management table stored in the storage unit in the position information management server according to the first embodiment;

FIG. 5 is a structural diagram of an identification (ID) correspondence management table stored in the storage unit in the position information management server according to the first embodiment;

FIG. 6 is a structural diagram of a universal ID (UID) position management table stored in the storage unit in the position information management server according to the first embodiment;

FIG. 9 is a structural diagram of a service filter table stored in the storage unit in the position information management server according to the first embodiment;

FIG. 10 is an explanatory diagram of a specific example of a relationship between the position information management server and respective applications according to the first embodiment;

FIG. 17 is a structural diagram of a reader position management table according to the second embodiment;

FIG. 18 is a structural diagram of a tag signal management table according to the second embodiment;

FIG. 19 is a structural diagram of an ID position information management table according to the second embodiment;

FIG. 20 is a structural diagram of a basic event management table according to the second embodiment;

FIG. 21 is a structural diagram of an applied event management table according to the second embodiment;

FIG. 22 is a list of applied events registered as a record in the applied event management table according to the second embodiment;

FIG. 23 is a structural diagram of an event status management table according to the second embodiment;

FIG. 24 is a structural diagram of an area table according to the second embodiment;

FIG. 25 is a structural diagram of a filter table according to the second embodiment;

FIG. 26 is an explanatory diagram of a correlation example between position information and the like input from a position information obtaining unit and an event generated by a basic event generating unit according to the second embodiment;

FIG. 27 is an example of a record registered in the event status management table, when 'STAY_AREA' event is generated by an applied event generating unit in a position information management server according to the second embodiment;

FIG. 28 is an example of the event status management table in which 'LEAVE' event generated by the applied event generating unit of the position information management server according to the second embodiment is retained;

DETAILED DESCRIPTION OF THE PREFERRED EMBODIMENTS

Figure 1:
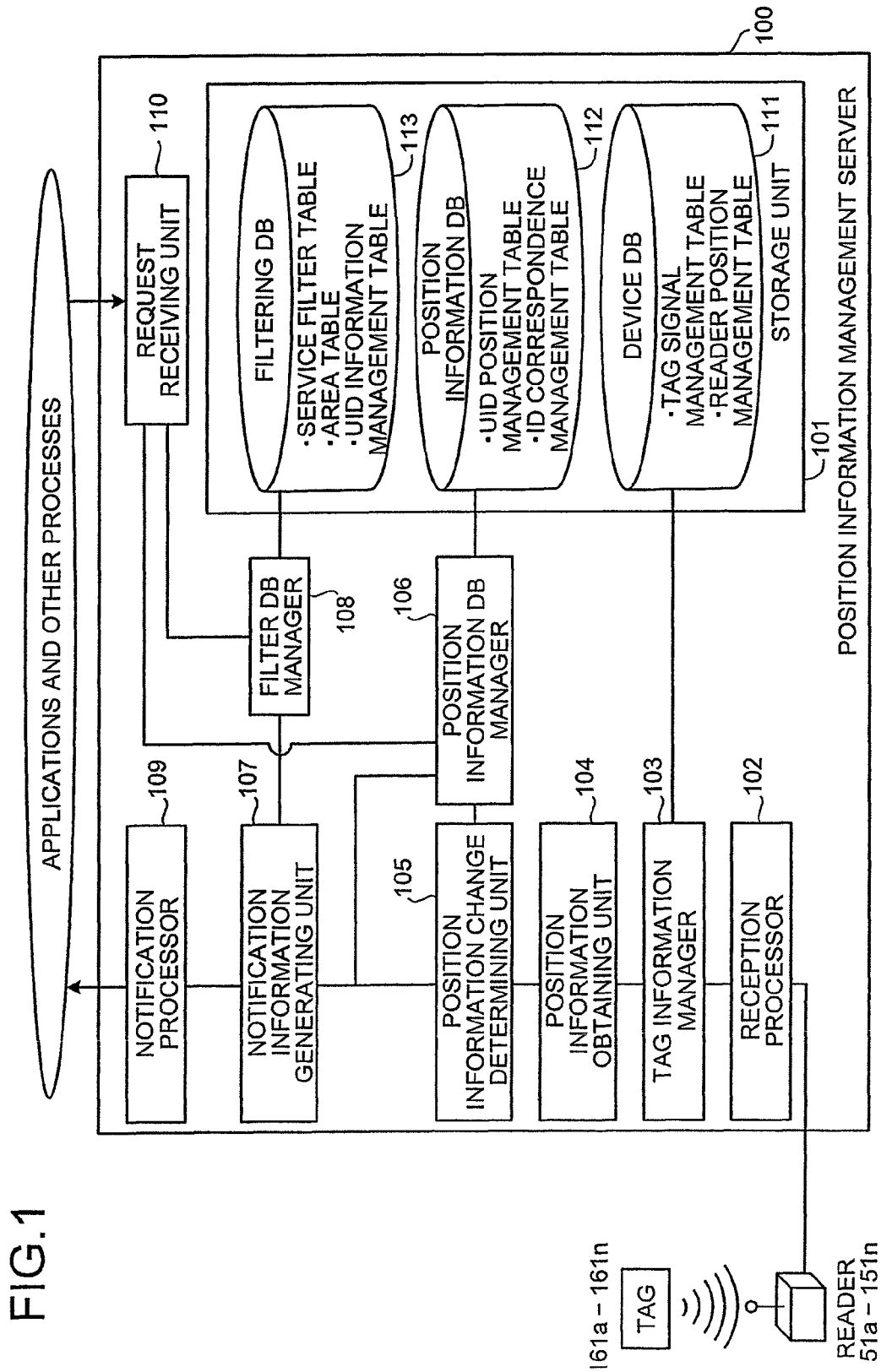
FIG. 1 is a configuration block diagram of a position information management system according to a first embodiment of the present invention.

FIG. 1 is a configuration block diagram of a position information management system according to a first embodiment of the present invention. The position information management system according to the first embodiment includes active tags 161a to 161n attached to an object, readers 151a to 151n that receive an identification signal, respectively, transmitted from the active tags 161a to 161n, and a position information management server 100 connected to the readers 151a to 151n.

As shown in FIG. 1, the readers 151a to 151n detect a signal output from the active tags 161a to 161n. The readers 151a to 151n transmit information included in the detected identification signal and measured signal strength to the position information management server 100 connected via a network. The position information management server 100 transmits the information obtained based on the transmitted information and the measured signal strength for each application.

The object in this embodiment includes not only objects but also human bodies. Therefore, for example, a user retains an active tag 161l, an active tag 161m is attached to an object such as a PHS retained by the user, and the tag is detected under various situations such that the active tag 161n is attached to a freight, which is a an object to be delivered, and the processing described below can be performed.

The active tags 161a to 161n correspond to mobile information recording media, and are provided for each object. The active tags 161a to 161n in this embodiment send the identification signal for every second by a radio wave. In this embodiment, the mobile information recording medium is not limited to a tag sending the radio wave actively, and for example, can be a passive medium. As a more specific example, communication can be performed by a passive radio frequency identification (RFID) tag, or the Bluetooth standard or the ZigBee standard, which send radio waves actively.

The active tags 161a to 161n retain information for identifying at least the tag itself. In this embodiment, it is assumed that the active tags 161a to 161n retain a tag ID as the information identifying the tag itself.

That is, the readers 151a to 151n correspond to detectors, and when the identification signal is received from the active tags 161a to 161n, the tag ID included in the received identification signal and the measured signal strength are transmitted to an address and a port indicating the position information management server 100, and the position information management server 100 associates these pieces of information with a reader ID of the readers 151a to 151n. The reader ID can be specified by a correspondence between the reader ID and the address of the reader. The address of the reader as a sender can be specified by a sender address included in a header of a packet used at the time of transmitting the information.

As another embodiment different from the first embodiment, the readers 151a to 151n can associate the pieces of information with the reader ID indicating the readers 151a to 151n and transmit the information.

Figure 2:
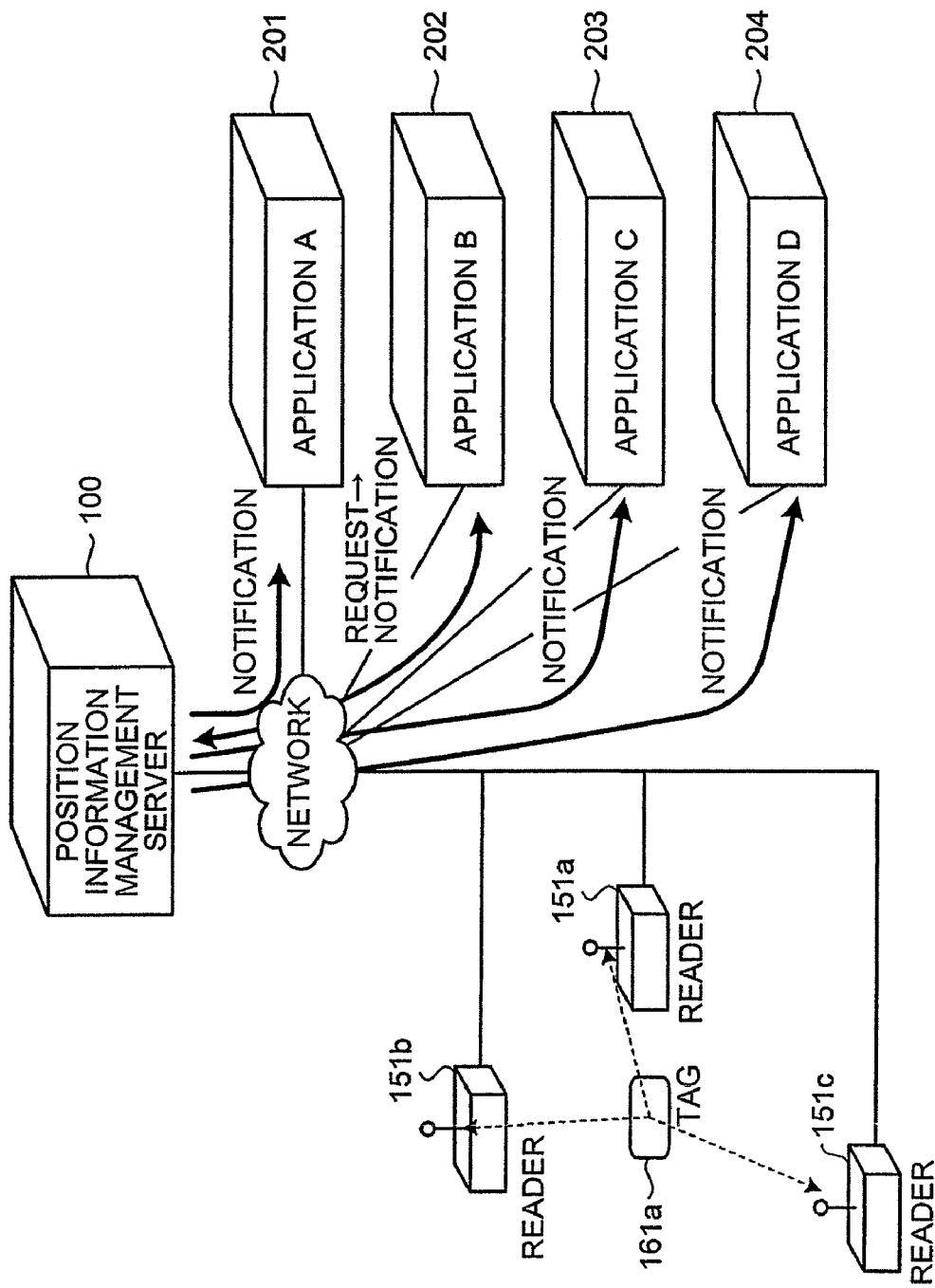
FIG. 2 is a conceptual explanatory diagram of the overall configuration of the position information management system.

FIG. 2 is a conceptual explanatory diagram of the overall configuration of the position information management server 100 of the present invention. The respective readers 151a to 151n, respectively, transmit the detected identification signal to the position information management server 100 together with the signal strength via the network. The position information management server 100 obtains the position information and the like of an object based on the received information, and notifies these pieces of information to applications A201 to D204 via the network. The notification to the applications A201 to D204 is transmitted when a predetermined condition is satisfied and when there is a request from each of the applications.

Returning to FIG. 1, the position information management server 100 includes a storage unit 101, a reception processor 102, a tag information manager 103, a position information obtaining unit 104, a position information change determining unit 105, a position information database (DB) manager 106, a notification information generating unit 107, a filter DB manager 108, a notification processor 109, and a request receiving unit 110. The position information management server 100 calculates the position information of the object based on the identification signal and the measured signal strength transmitted from the readers 151a to 151n, and notifies the application of the information satisfying the filter condition registered for each application in a filtering DB.

The storage unit 101 includes a device DB 111, a position information DB 112, and a filtering DB 113.

The device DB 111 retains a reader position management table and a tag signal management table.

FIG. 3 is a structural diagram of the reader position management table. As shown in FIG. 3, the reader position management table retains reader IDs, position information of the reader, reader addresses, and coordinate systems of the reader in association with each other. The address of the reader indicates, for example, an IP address for specifying the reader. Since the reader ID is associated with the reader address, the reader ID can be specified from the reader address of the sender of the information. Accordingly, the coordinate system and the position information of the reader can be specified based on the reader ID. The coordinate system indicates the position of the reader in a position coordinate, and a coordinate system different for each area is defined. In this embodiment, it is assumed that a different coordinate system is allocated for each level. Therefore, the field of "coordinate system" retains the number of levels.

FIG. 4 is a structural diagram of the tag signal management table. As shown in FIG. 4, the tag signal management table retains tag IDs, reader IDs, signal strength, and detection time in association with each other. That is, the tag signal management table manages the information obtained by associating the information transmitted from the readers 151a to 151n with the detection time as a record.

The position information DB 112 retains the ID correspondence management table and a UID position management table. FIG. 5 is a structural diagram of the ID correspondence management table. As shown in FIG. 5, the ID correspondence management table retains UIDs, types of device, and tag IDs in association with each other. It is assumed that the UID is obtained by allocating a unique ID to each of the active tags 161a to 161n, regardless of the type of device or the like. Accordingly, the active tags can be managed collectively, regardless of the type of device or the like. The type of device is used for recognizing a manufacturer or a marketer of the tag, or a difference between the active and passive media, or a difference in the communication standard, in an environment where a plurality of types of tags is used.

FIG. 6 is a structural diagram of the UID position management table. As shown in FIG. 6, the UID position management table retains the UIDs, coordinate systems, position information, and detection time in association with each other. The respective records retained by the UID position management table are generated based on the records retained by the reader position management table, the tag signal management table, and the ID correspondence management table.

The filtering DB 113 retains the area table, the UID information management table, and a service filter table.

Figures 7, 8:
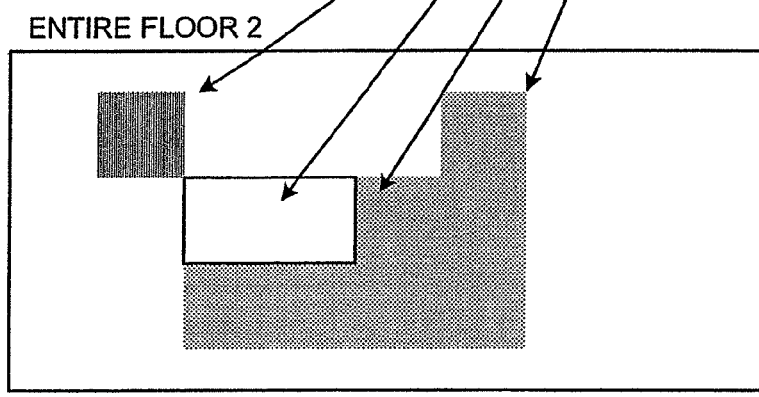
FIG. 7 is a structural diagram of an area table stored in the storage unit in the position information management server according to the first embodiment.
FIG. 8 is a structural diagram of a UID information management table stored in the storage unit in the position information management server according to the first embodiment.

FIG. 7 is a structural diagram of the area table. As shown in FIG. 7, the area table retains coordinate systems, position 1, position 2, and labels in association with each other. As shown in FIG. 7, the area table associates with the coordinate system, the position 1, the position 2, and the labels. The area indicated by an arrow in each record indicates the area corresponding to the record. The respective fields in the area table are explained. The "position 1" field and the "position 2" field are used for defining the area. Specifically, a rectangular area can be specified by assuming the position coordinate of the "position 1" field and the position coordinate of the "position 2" field as opposite apexes. The "label" field retains a name indicating the specified rectangular area.

FIG. 8 is a structural diagram of the UID information management table. As shown in FIG. 8, the UID information management table retains UIDs, names, and types in association with each other. The name indicates a name of an object, and a unified name can be used in respective applications by retaining the name by the UID information management table. People can identify the object itself equipped with the tag by retaining the name in the UID information management table. The type field retains the attribute of an object indicated by the UID, such as whether an object specified by the UID is a person or an object, and if it is a person, to which the person belongs, or if it is an object, the property thereof and the like. Thus, by retaining the type in association with the UID, filtering can be performed based on the attribute of the object.

FIG. 9 is a structural diagram of a service filter table. As shown in FIG. 9, the service filter table retains events, filter types, UIDs, labels, coordinate systems, positions, service types, cryptography, transmission destinations, and transmission information in association with each other. The "event" field indicates the condition for transmitting the event, and for example, when the event is "coordinate change/update", if the position coordinates, at which the active tags 161a to 161n are detected, have changed from the position coordinates detected previously, the event is transmitted. The fields of "filter type", "UID", "label", "coordinate system", and "position" indicate filtering conditions, and the event is transmitted only when the conditions described in these fields are satisfied. In other words, these fields correspond to notification condition information. When there is no description in these fields, it is assumed that the filtering condition is not particularly set. The field of "service type" retains a transmission protocol at the time of transmission. The "cryptography" field retains an encryption method at the time of transmission to the application. The "transmission destination" field indicates the transmission destination of information, and there is an application for processing the information at the transmission destination. The "transmission information" field retains the type of the information to be transmitted, and in other words, corresponds to notification type information. Since the type of information to be transmitted is retained in the "transmission information" field, only the information necessary for each application can be transmitted. That is, when the filtering condition retained in the record is satisfied, the information retained in the "transmission information" is obtained, and the obtained information is transmitted to the "transmission destination" retained in association with each other in the record, by using the transmission protocol set by the "service type". The information to be transmitted can be obtained by referring to the associated "transmission information" field. Accordingly, the transmission condition can be set for each application, and the information can be transmitted only when the condition is satisfied.

In the service filter table, records serving as the filter can be added, deleted, or changed in response to a request from the application.

The record information retained in the service filter table retains the filter, transmission destination, type of the information to be transmitted, and the like, used when the notification information is generated, and in other words, corresponds to notification rule information.

The reception processor 102 receives the information transmitted from the readers 151a to 151n. In this embodiment, the reception processor 102 receives the tag ID and the measured signal strength received from the readers 151a to 151n via the network. At the time of reception, the IP address of the reader can be specified by referring to the header of the received packet. The tag ID, the signal strength, and the IP address of the reader are pieces of information defined to be transmitted from the readers 151a to 151n, and correspond to the predetermined information. The reception processor 102 requests the tag information manager 103 to update the tag signal management table by the information in which the received information is associated with the detection time. The detection time is the time when the readers 151a to 151n detect the active tags 161a to 151n, that is, the time when the tag ID and the like are received from the readers 151a to 151n.

The tag information manager 103 performs processing with respect to the respective tables retained in the device DB. In this embodiment, the tag information manager 103 specifies the reader ID from the IP address of the reader input from the reception processor 102 by referring to the reader position management table, associates the specified reader ID with the input tag ID, the signal strength, and the detection time, and updates the record in which the tag ID in the tag signal management table and the reader ID match with each other. Therefore, the tag signal management table retains the newest information of the tag ID.

When the information is not updated by the record retained in the tag signal management table, the tag information manager 103 retains the information for a certain period of time. In this embodiment, the certain period of time is assumed to be three seconds. Therefore, for example, when a predetermined active tag has been detected by the readers a, b, and c one second before, but is detected only by the readers a and b at this time, only the records associated with the reader ID indicating the readers a and b are updated, and for the record associated with the reader ID indicating the reader c, the information one second before is retained. Therefore, if the active tag has been detected at least once within three seconds, the information associated with the tag ID is retained. That is, when the signal from the active tag cannot be detected temporarily due to some fault, the position information can be calculated.

The position information obtaining unit 104 obtains the reader ID and detection time associated with the tag ID retained in the tag signal management table and the coordinate system and position information associated with the reader ID retained in the reader position management table, from the tag information manager 103 for each predetermined period, and calculates the position information associated with the tag ID based on the obtained information, to obtain the position information of the active tags 161a to 161n.

A method for specifying the position information by the position information obtaining unit 104 is explained. For example, when there is only one reader having detected the active tag 161b, the coordinate system and the position information of the detected reader are designated as those indicating the position of the active tag 161b. The calculation method of the position information of the active tag 161c when a plurality of readers has detected the active tag 161c can be any method among various methods currently proposed. For example, there can be a method of averaging the position information of the readers having detected the active tags, or weighting the position information of the readers having detected the active tags with the signal strength and then averaging the position information. The position information obtaining unit 104 associates the obtained coordinate system and position information with the tag IDs of the active tags 161a to 161n and detection time, and outputs the information to the position information change determining unit 105. The obtained position information corresponds to medium position information.

It is assumed that the position information obtaining unit 104 obtains the newest information of the respective active tags 161a to 161n for each predetermined period. In this embodiment, the predetermined period is assumed to be three seconds. The tag information manager 103 retains the information for three seconds or more. Therefore, the position information obtaining unit 104 can calculate the position information based on the updated information, even in a radio wave condition where the reader can receive the signal sent from the active tag only once in three times.

The position information change determining unit 105 compares the position information associated with the tag ID input from the position information obtaining unit 104 with the position information associated with the tag ID input from the position information DB manager 106 and detected before, to determine whether the position of the active tags 161a to 161n are changed.

When having determined that the position is changed, the position information change determining unit 105 requests the position information DB manager 106 to update the UID position management table by the changed position information. At this time, the position information change determining unit 105 associates the position information with the tag ID and the detection time and outputs the information. Thereafter, the position information change determining unit 105 receives the UID, the position information, and the detection time as the update information from the position information DB manager 106, associates the update information with an event name 'coordinate change/confirmation', and outputs a request for generation of notification information to the notification information generating unit 107. The received UID indicates an object having moved in a state that the active tag is retained, and corresponds to retained identification information.

The position information DB manager 106 performs processing with respect to the respective tables retained in the position information DB. In this embodiment, when the position information change determining unit 105 outputs the position information and the tag ID, the position information DB manager 106 obtains the position information associated with the tag ID based on the ID correspondence management table and the UID information management table, and outputs the position information to the position information change determining unit 105.

When the tag ID, the position information, and the detection time are input together with an update request from the position information change determining unit 105, the position information DB manager 106 obtains the UID associated with the tag ID by using the ID correspondence management table, and associates the obtained UID, the position information, and the detection time with each other to update the UID information management table. Since the UID information management table is updated when the object moves, it means that the UID information management table retains the current position information of all objects attached with the active tag.

The position information DB manager 106 outputs the record information obtained by updating the UID information management table, specifically, the information obtained by associating the UID, the position information and the detection time with each other to the position information change determining unit 105. Accordingly, the position information change determining unit 105 can request generation of the notification information.

When the event name and transmission condition are input together with a transmission request are input from a request receiving unit 110, the position information DB manager 106 outputs the record information satisfying the transmission condition together with the event name received by the request receiving unit 110 to the notification information generating unit 107.

The notification information generating unit 107 generates the notification information based on the information input together with the request for generation of the notification information. In this embodiment, the notification information generating unit 107 inputs or outputs the event name, the update information, or the record information input from the position information change determining unit 105 and the position information DB manager position information DB manager 106 with respect to the filter DB manager 108, and generates the notification information satisfying the condition retained in the service filter table. A specific process procedure up to generation of the notification information will be explained later. It is assumed here that the event name is included in the generated notification information. Hence, the application of the sender can specify in which case the notification information has been generated.

The notification information generating unit 107 obtains record information corresponding to the information input from the UID information management table, uses the obtained record information to determine whether the condition retained in the service filter table is satisfied, and generates the notification information when the condition is satisfied. As a specific example, the notification information generating unit 107 uses the UID as a key for obtaining the record information corresponding to the input information, to obtain the record matching with the UID. Accordingly, the name and type associated with the input information can be obtained. The name and type are attributes of the object indicated by the UID, and in other words, corresponds to obtained attribute information.

To satisfy the condition retained in the service filter, table stands for satisfying a condition defined by the "position 1" and the "position 2", when the position information included in the input information is present in a rectangular area defined by the "position 1" and "position 2" in each record in the service filter table.

As another example, when the "UID" in each record in the service filter table matches with a UID included in the input information, the condition defined by the "UID" is satisfied. Thus, when the condition retained by each record is satisfied, the notification information generating unit 107 generates the notification information.

As another example, the "UID" in the input information is compared with the "UID" field in the UID information management table, to obtain matched record information. When the "type" included in the obtained record information matches with the "filter type" of each record in the service filter table, the condition defined by the "filter type" is satisfied. Thus, when the condition retained by each record is satisfied, the notification information generating unit 107 generates the notification information. The filter type stands for a condition for filtering the attribute of the object, and in other words, corresponds to attribute information.

When the condition in the record in the service filter table is satisfied, the notification information generating unit 107 refers to the "transmission information" field in the record indicating the concerned filter, to obtain the information described in the "transmission information", and adds the obtained information to the notification information. Accordingly, notification information including information appropriate to each application can be generated.

In this embodiment, the information described in the "transmission information" field is information that can be obtained from the correspondence with the respective pieces of input information or the input information in the table retained in the filtering DB 113, such as the UID information management table. Accordingly, the notification information generating unit 107 can obtain information necessary for generating the notification information from the information described in the "transmission information". When it is desired to obtain information from the filtering DB 113, the notification information generating unit 107 makes a request to the filter DB manager 108 as required.

The notification information generating unit 107 outputs the generated notification information to the notification processor 109. The notification information generating unit 107 outputs the transmission destination and the service type retained in the record indicating the concerned filter. Furthermore, when the filter retains cryptography, the notification information generating unit 107 outputs the cryptography together with the notification information.

The filter DB manager 108 performs processing with respect to each table retained in the filtering DB 113. In this embodiment, the filter DB manager 108 obtains a list of matching filters from the service filter table according to the event name input from the notification information generating unit 107, and outputs the list to the notification information generating unit 107. Furthermore, the filter DB manager 108 obtains information associated with the record information input to the notification information generating unit 107 and the update information from the UID information management table or the area table, and outputs the information to the notification information generating unit 107.

When the request receiving unit 110 inputs information indicating that a filter is to be added and the condition for addition, the filter DB manager 108 adds a record indicating the condition to the service filter table. Also when the request receiving unit 110 inputs a notice that a filter is to be changed or deleted, the filter DB manager 108 performs a change or deletion with respect to the service filter table. In other words, the filter DB manager 108 corresponds to a notification rule manager.

When the notification information, transmission destination, and service type are input from the notification information generating unit 107, the notification processor 109 calls a program for performing transmission according to a transmission protocol retained by the service type, to transmit the notification information to the transmission destination. When cryptography is input together with the notification information, the notification processor 109 encrypts the notification information by using the input encryption method and transmits the notification information.

According to the input encryption method, communication between the position information management server 100 and the application is encrypted. The encryption unit can use any means, and for example, Ipsec, https, SSL, or DES can be considered. Since the notification processor 109 performs the encryption processing, leak of the information can be prevented. Furthermore, privacy can be protected, and security can be improved.

FIG. 10 is an explanatory diagram of a specific example of a relationship between the position information management server 100 and respective applications. When the active tag 161a attached to a user A has been detected, as shown in FIG. 10, by the reader 151a previously, but detected by the reader 151b this time, the position information change determining unit 105 in the position information management server 100 determines that the active tag 161a has moved based on the comparison with the position information of the previous time. When the information (including the position information) input together with a request for generation of the notification information from the position information change determining unit 105 satisfies the filter condition retained in the service filter table, the notification information generating unit 107 in the position information management server 100 obtains the information of a type retained in the "transmission information" of the concerned filter and transmits the information to the "transmission destination" retained by the filter.

As a specific example, an application that confirms whereabouts is explained. When "coordinate change/update" is registered in the event field, "PERSON" in the filter type field, and the location of the application in the transmission destination field, respectively, in the service filter table in association with each other, as the filter for the application that confirms whereabouts, the user information in which a change in the position information has been detected is transmitted to the application at all times. Accordingly, the application can display the whereabouts of all users.

An application that locks a PC 1001 is explained next. First, the application that locks the PC 1001 so that other users cannot use the PC 1001, when the application has been installed in the PC 1001 used by user A and the user A is away from the PC 1001, is explained. When "coordinate change/update" is registered in the event field, "PERSON" in the filter type field, UID indicating the user A in the UID field, the location of the PC 1001 in the position field, and the address and port number indicating the application of the PC 1001 in the transmission destination field, respectively, in the service filter table in association with each other, as the filter of the application, the application can obtain the information of the user A who sits at or leaves the PC 1001. The filter is registered in the position information management server 100 when the user A logs in the PC 1001, in response to a request from the application. When the user A logs out from the PC 1001, the record is deleted according to the request from the application. Thus, by registering, changing, or deleting the filter according to the request from the application, the application can obtain the information appropriate to the situation.

An example of filter processing performed in practice when the shift of the user A has been confirmed is explained with reference to the table shown in FIG. 9. First, when a shift of the active tag 161a attached to the user A has been detected, the condition of the event to be transmitted due to the detection of the shift becomes "coordinate change/update". Furthermore, if it is assumed that the tag ID of the active tag 161a attached to the user A is TAGID0001, UID:ID0001 can be derived from the ID correspondence management table shown in FIG. 5. Type: PERSON can be also derived from the UID:ID0001 from FIG. 8.

The presence of a record satisfying these conditions is verified next. First, since the event is "coordinate change/update", the No. 4 record in FIG. 9 does not satisfy the condition due to the event being "voltage change". Since No. 5 record indicates that the file type is "OBJ", it does not satisfy the condition as well. Likewise, No. 2 record does not satisfy the condition, since the UID is "ID0002", and No. 3 record does not satisfy the condition, since the label is "meeting room", and the user A is at his desk. In other words, only No. 1 record satisfies all the conditions, and hence, the UID of the user A and the event name "coordinate change/update" are transmitted in HTTP-GET to "192.168.0.10/per.cgi" retained in the No. 1 record.

The request receiving unit 110 receives a request from the application or process connected to the position information management server 100, and outputs information appropriate to the request or generates a filter. In this embodiment, when information to be retained as a filter such as the filter condition and the transmission destination is received from another application, the request receiving unit 110 outputs the received information together with a registration request of the filter to the filter DB manager 108.

The request receiving unit 110 also receives a request for filter change or deletion, in addition to the request for filter registration. The received request is output to the filter DB manager 108 together with information specifying the filter received with the request, and in the case of a change of the filter, together with the information indicating the change condition. The condition specifying the filter can be any condition, so long as a record such as the "transmission destination" field and the "event" field in the service filter table can be specified.

Figure 11:
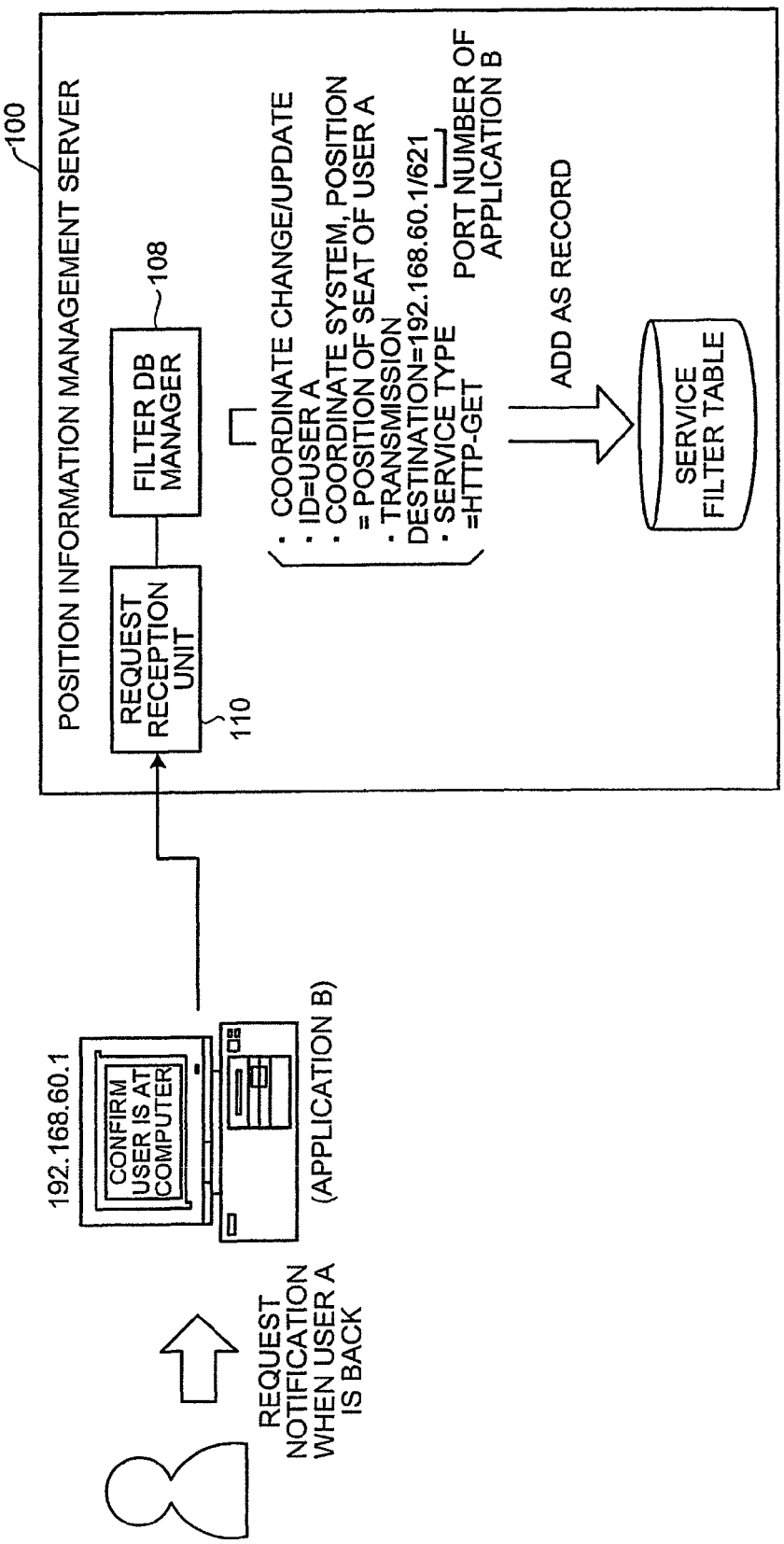
FIG. 11 is an explanatory diagram of an example of a procedure until a filter is generated in response to a request from the application by the position information management server.

FIG. 11 is an explanatory diagram of an example of a procedure until a filter is generated in response to a request from the application by the position information management server 100. As shown in FIG. 11, it is assumed that an application sends a request to transmit information when a predetermined condition is satisfied to the position information management server 100, together with the transmission condition and the type of information to be transmitted. In this case, the request receiving unit 110 receives the request for regular transmission together with the transmission condition and the type of information to be transmitted. The request receiving unit 110 generates an event name appropriate to the request for regular transmission. The request receiving unit 110 then outputs the event name, transmission condition, transmission destination, and transmission information (that is, the type of information to be transmitted) to the filter DB manager 108. The transmission destination is a location of the application having sent the request. The filter DB manager 108 then adds a record in which the transmission condition, the transmission destination, and the transmission information are associated with each other to the service filter table.

Accordingly, when the update information or record information obtained by the notification information generating unit 107 in the position information management server 100 satisfies the condition in the record added to the service filter table, the information is transmitted to the transmission destination indicated by the record.

When a request for immediate transmission of information and the transmission condition are received from another application, the request receiving unit 110 generates an event name corresponding to the transmission request. The request receiving unit 110 outputs information to the notification information generating unit 107, designating the application having sent the transmission request as the transmission destination, and outputs the transmission condition and the event name to the position information DB manager 106 together with the transmission request. Accordingly, the position information DB manager 106 obtains the record information satisfying the condition and outputs the information to the notification information generating unit 107, and the notification information generating unit 107 can generate notification information to be transmitted to the input transmission destination based on the input record information.

Figure 12:
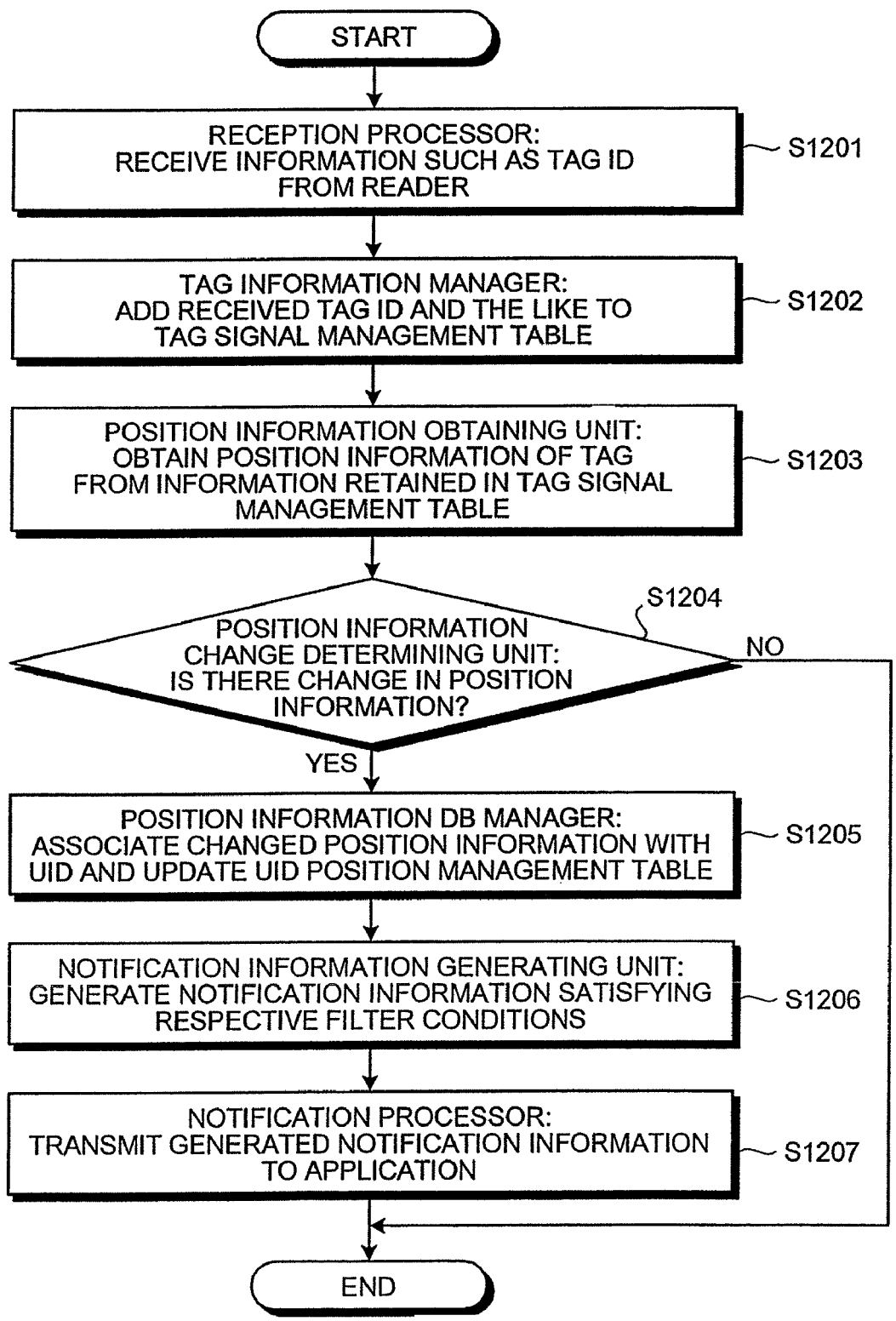
FIG. 12 is a flowchart of a process procedure in the position information management server according to the first embodiment, since having received information such as a tag ID until notification information is sent to the application when there is a change in the position information.

The processing in the position information management server 100 according to the first embodiment configured as described above is explained, since having received the information such as the tag ID until the notification information is sent to the application when there is a change in the position information. FIG. 12 is a flowchart of a process procedure in the position information management server 100 according to the first embodiment.

First, the reception processor 102 receives the information such as the tag ID of the active tags 161a to 161n detected by the readers 151a to 151n from the readers 151a to 151n (step S1201).

The tag information manager 103 updates the tag signal management table, associating the tag ID received by the reception processor 102, the reader ID, the signal strength, and the detection time of the reader having sent the information with each other (step S1202).

The position information obtaining unit 104 then obtains the tag ID of the active tags 161a to 161n detected within three seconds, the reader ID and the signal strength of the detected reader, and the position information for each reader from the tag information manager 103 for each predetermined period, calculates the position information associated with the tag ID based on the obtained information, and obtains the position information of the active tags 161a to 161n (step S1203).

The position information change determining unit 105 compares the position information obtained by the position information obtaining unit 104 and the position information input from the position information DB manager position information DB manager 106 and retained in the position information DB 112, to determine whether the position has changed (step S1204). When having determined that the position information has not been changed, the position information change determining unit 105 finishes processing without performing particular processing (step S1204: No).

When the position information change determining unit 105 determines that the position information has been changed, the position information DB manager 106 updates the UID position management table by the record in which the UID obtained by using the tag ID as a key, the position information, the coordinate system, and the detection time in association with each other (step S1205).

When the information updated by the position information DB manager 106 with respect to the UID position management table and a request for generation of the notification information are input from the position information change determining unit 105, and if the input information satisfies the filter condition indicated by the respective records in the service filter table, the notification information generating unit 107 obtains the information specified by "transmission information" field retained by the filter, to generate the notification information by associating the obtained information with each other (step S1206).

The notification processor 109 transmits the generated notification information to the transmission destination specified by the "transmission destination" field retained by the filter (step S1207). At the time of transmission, the notification processor 109 transmits the notification information by using a transmission protocol retained by the service type of the filter, and when the filter cryptography is defined, encrypts the information by using the defined cryptography.

The information appropriate to each application can be transmitted according to the process procedure described above, after having detected the active tags 161a to 161n. The process procedure is an example of a procedure since having received the information such as the tag ID until the notification information is generated when there is a change in the position information to perform notification processing according to the first embodiment, and the present invention is not limited thereto.

In this process procedure, a case that the position information has been changed is explained as the condition for the position information management server 100 to transmit the notification information. However, the notification condition is not limited to the case that the position information has been changed, and any condition that can be set as an event in the service filter table can be used. For example, voltage reduction of the active tags 161a to 161n can be considered.

Figure 13:
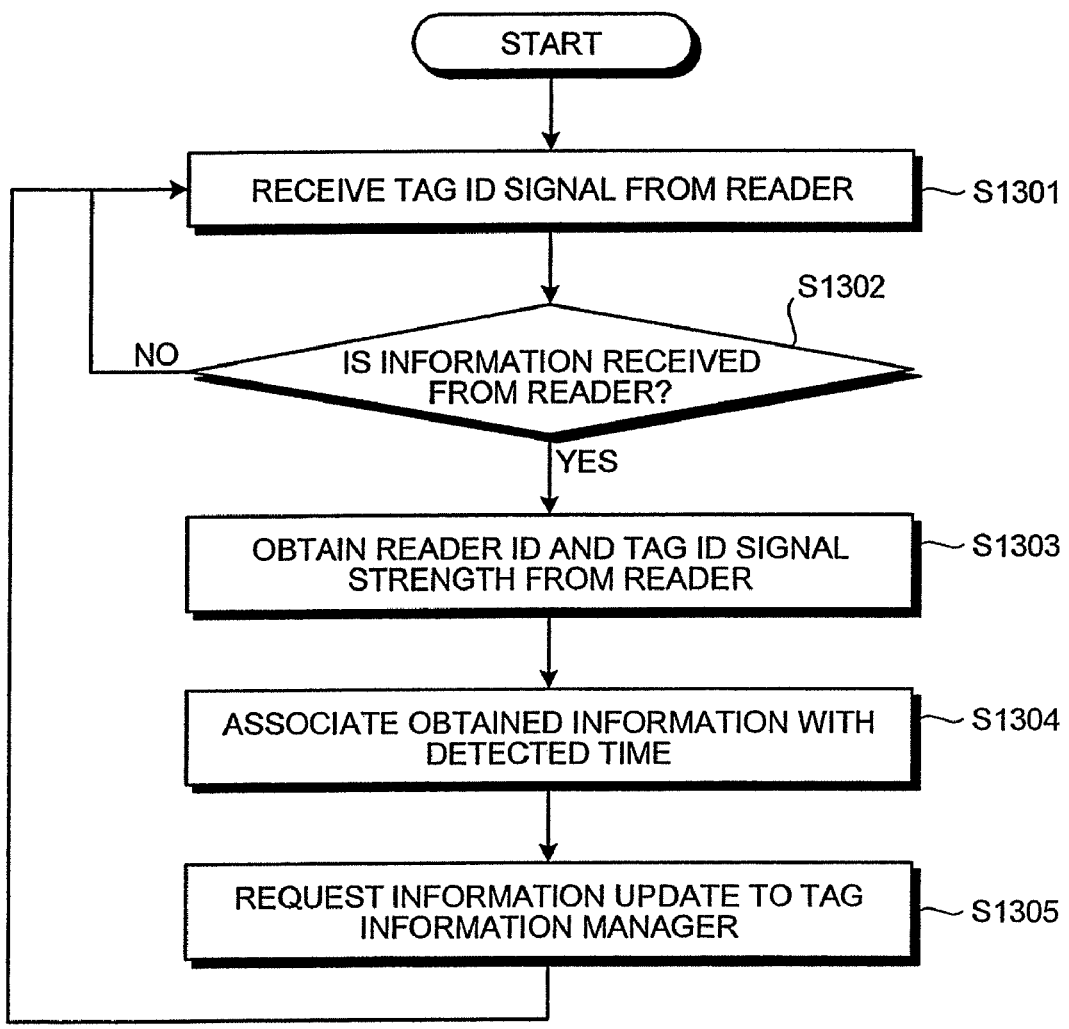
FIG. 13 is a flowchart of a process procedure performed by a reception processor in the position information management server according to the first embodiment, since having received information from the reader until update of a tag signal management table is requested to a tag information manager.

Subsequently, processing by the reception processor 102 in the position information management server 100 according to the first embodiment is explained, since reception of information from the readers 151a to 151n until making an update request of the tag signal management table to the tag information manager 103. FIG. 13 is a flowchart of a process procedure performed by the reception processor 102 in the position information management server 100 according to the first embodiment.

First, the reception processor 102 receives the information such as tag ID from the readers 151a to 151n (step S1301). The reception processor 102 then determines whether the information is received from the readers 151a to 151n (step S1302). When it is determined that the information has not been received (step S1302: No), the reception processor 102 receives the information again at step S1301.

When it is determined that the information has been received from the readers 151a to 151n (step S1302: Yes), the reception processor 102 obtains the received tag ID and the signal strength, and also obtains the reader ID from the reader address of the sender (step S1303).

Subsequently, the reception processor 102 associates the current time as the detection time with the tag ID, the signal strength, and the reader ID obtained at step S1303 (step S1304).

The reception processor 102 outputs the associated tag ID, signal strength, reader ID, and detection time to the tag information manager 103, and makes an update request of the tag signal management table by the information output to the tag information manager 103 (step S1305).

The tag signal management table can be updated by the received information, according to the process procedure described above. The process procedure is an example a procedure since reception of information from the readers 151a to 151n until making a request of information for updating the tag signal management table to the tag information manager 103, and the present invention is not limited thereto.

Figure 14:
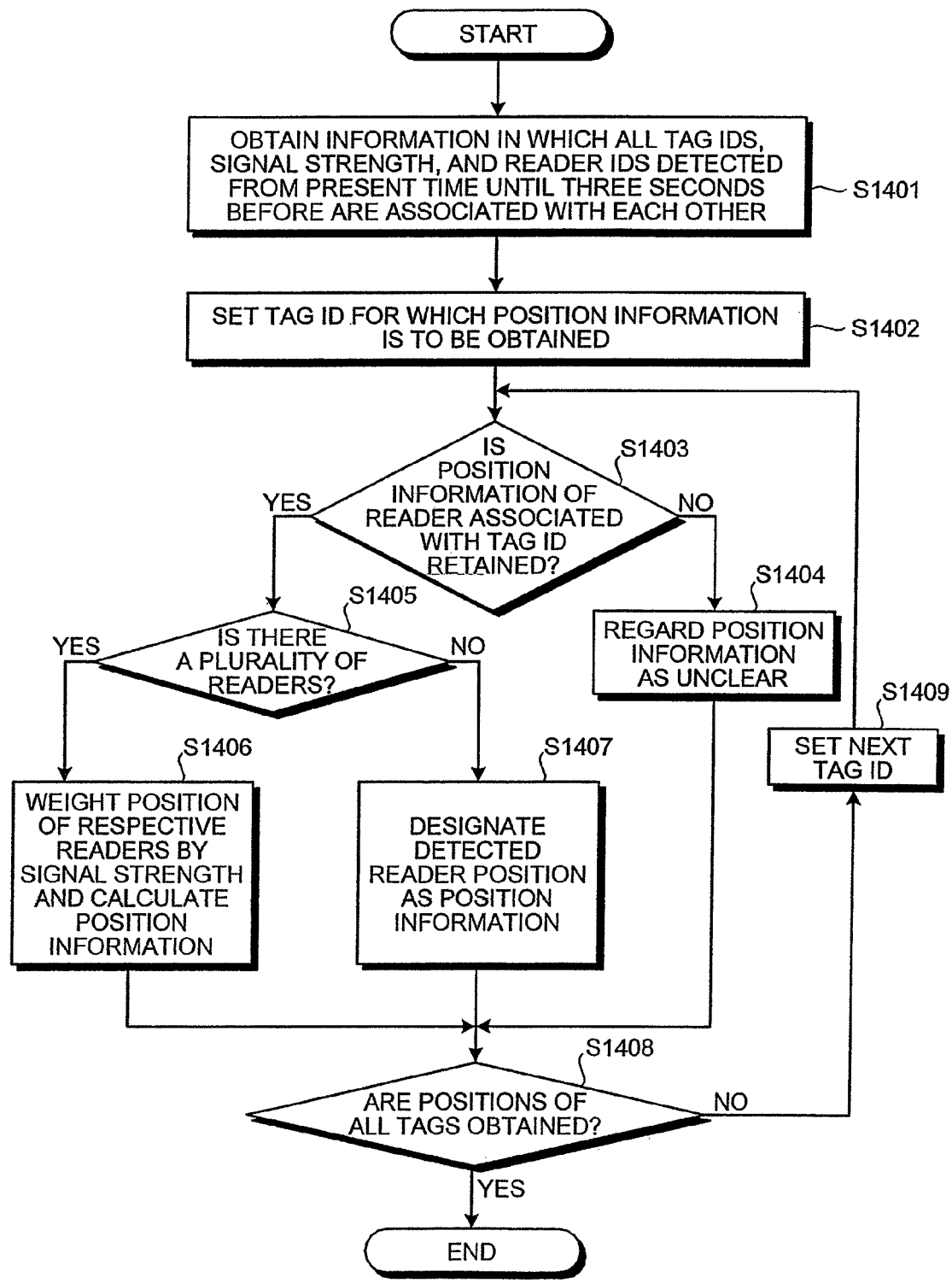
FIG. 14 is a flowchart of a process procedure performed by a position information obtaining unit in the position information management server according to the first embodiment, since having obtained the information such as the tag ID detected within three seconds until obtaining the position information of an active tag.

The position information of the active tags 161a to 161n is obtained by the information retained in the tag signal management table. Processing performed by the position information obtaining unit 104 in the position information management server 100 according to the first embodiment is explained, since having obtained the information such as the tag ID detected within three seconds until obtaining the position information of the active tag is explained. FIG. 14 is a flowchart of a process procedure performed by the position information obtaining unit 104 in the position information management server 100 according to the first embodiment.

The position information obtaining unit 104 obtains entire record information for the detection time retained in the tag signal management table, from the present until three seconds before, from the tag information manager 103 (step S1401). In the record information, the tag ID, the signal strength, the reader ID, and the detection time are associated with each other.

The position information obtaining unit 104 then sets one tag ID, for which the position information is to be obtained, from the obtained record information (step S1402).

The position information obtaining unit 104 asks the tag information manager 103 if the position information of the reader ID associated with the set tag ID as record information is present, thereby confirming whether the position information associated with the reader ID is present based on the information input from the information manager 103 (step S1403). At this time, the tag information manager 103 makes a search in the reader position management table regarding if there is the position information associated with the reader ID.

Subsequently, when having confirmed that there is no position information associated with the reader ID (step S1403: No), the position information obtaining unit 104 determines that the position information of the tag ID associated with the reader ID is unclear (step S1404).

When there is the position information associated with the reader ID (step S1403: Yes), the position information obtaining unit 104 determines whether there is a plurality of readers associated with the tag ID (step S1405). As a specific example, when there are pieces of record information associated with the tag ID in the tag signal management table, the position information obtaining unit 104 determines that there are readers associated with the tag ID.

When having determined that there are readers (step S1405: Yes), the position information obtaining unit 104 weights the position information of these readers by the signal strength and calculates the position information of the active tag (step S1406).

When having determined that there is only one reader that has detected the tag ID (step S1405: No), the position information obtaining unit 104 designates the position of the reader that has detected the tag ID as the position information of the active tag (step S1407).

The position information obtaining unit 104 determines whether all pieces of position information of all detected tag IDs have been obtained (step S1408). When having determined that all pieces of position information of all tag IDs have been obtained (step S1408: Yes), the position information obtaining unit 104 outputs the obtained pieces position information to the position information change determining unit 105 to finish the processing.

When having determined that all pieces of position information of all tag IDs have not been obtained (step S1408: No), the position information obtaining unit 104 sets the next tag ID to be obtained from tag IDs for which the position information has not been obtained (step S1409). The position information obtaining unit 104 then restarts the processing from step S1403.

The position information associated with the tag ID can be obtained according to the process procedure described above. The process procedure is an example of a procedure since having obtained the information such as the tag ID detected within three seconds until specifying it as position information, and the present invention is not limited thereto.

Figure 15:
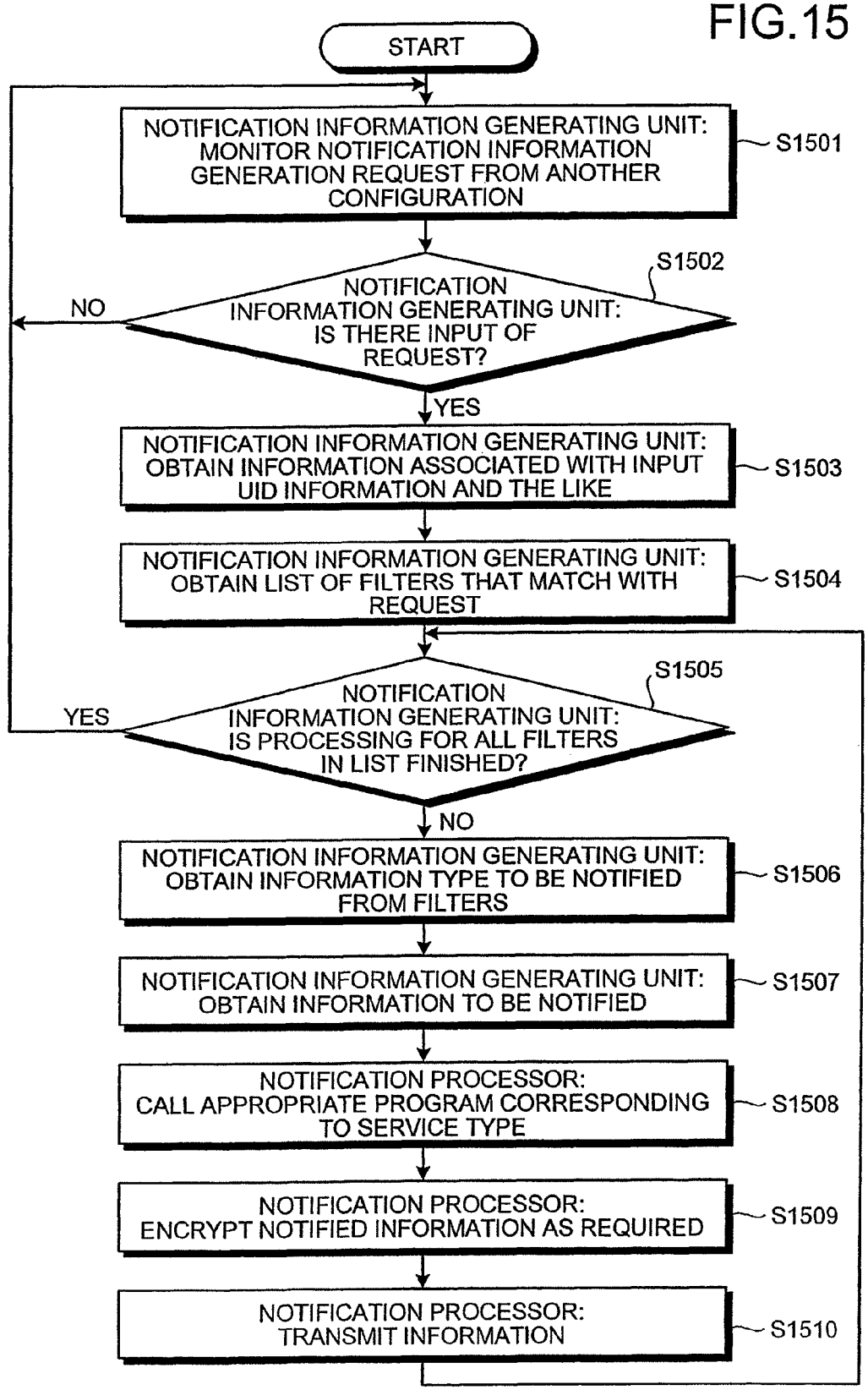
FIG. 15 is a flowchart of a process procedure performed by a notification information generating unit in the position information management server according to the first embodiment, in which notification information generating unit monitors whether there is a request for generation of notification information from another configuration, and when there is a request, generates notification information, and notifies the notification information generated by the notification information generating unit.

Processing performed by the notification information generating unit 107 in the position information management server 100 according to the first embodiment is explained next, in which the notification information generating unit 107 monitors whether there is a request for generation of notification information from another configuration, and when there is the request, generates notification information to send the notification information generated by the notification information generating unit 107. FIG. 15 is a flowchart of a process procedure performed by the notification information generating unit 107 in the position information management server 100 according to the first embodiment. In this flowchart, a case that update information or record information input from the notification information generating unit 107 or the notification processor 109 is only one is explained.

First, the notification information generating unit 107 monitors whether there is a request for generation of notification information from the position information change determining unit 105 and the position information DB manager 106 (step S1501).

The notification information generating unit 107 determines whether the request for generation of the notification information has been input (step S1502). When having determined that the request for generation of the notification information is not input (step S1502: No), the notification information generating unit 107 restarts monitoring of the request for generation of the notification information at step S1501.

When having determined that the request for generation of the notification information is input (step S1502: Yes), the notification information generating unit 107 obtains the information associated with the record information or update information input together with the request for generation of the notification information (step S1503).

As a detailed example of obtaining the associated information, the notification information generating unit 107 obtains the name and type associated by the UID retained in the UID information management table from the UID of the record information or update information input thereto, and then obtains a label associated by the coordinate system, the position 1, and the position 2 in the area table, based on the input coordinate system and position information.

The notification information generating unit 107 obtains a filter list appropriate to the request (step S1504). As a specific example, it is assumed that the UID, coordinate system, and position information, which are the record information or update information, the input event name, and the name, type, and label obtained at step S1503 are the conditions for obtaining the filter. The notification information generating unit 107 obtains a filter list satisfying these conditions, in other words, the record information in the service filter table. Since the record information or update information and the information obtained at step S1503 are compared with the condition set by the filter, these pieces of information are the comparison information.

For example, at step S1502, when the generation request of the notification information is input together with the update information and the event name "coordinate change/update", the notification information generating unit 107 outputs the record information or update information, the event name, and the information such as the type obtained at step S1503 to the filter DB manager 108. The filter DB manager 108 inputs the record information in the service filter table satisfying the condition in the output information to the notification information, generating unit 107.

Thus, to obtain the filter satisfying the conditions indicated by the input update information or record information means to select the update information or record information satisfying the obtained filter condition.

The notification information generating unit 107 then determines whether the processing for all filters in the list, in other word, the processing for obtained all pieces of record information has finished (step S1505). When having determined that the processing has finished (step S1505: Yes), the notification information generating unit 107 restarts the processing from monitoring of the generation request of notification information at step S1501.

When having determined that the processing is not finished (step S1505: No), the notification information generating unit 107 obtains the type of information to be notified from the "transmission information" field in the obtained record information indicating the filter (step S1506). For example, in the case of No. 3 record in FIG. 9, the notification information generating unit 107 obtains "UID, position, time" as the type of information to be transmitted.

Subsequently, the notification information generating unit 107 obtains the information to be transmitted based on the type of information to be transmitted obtained at step S1506 (step S1507). When the type of information to be transmitted is "UID, position, time", the notification information generating unit 107 obtains the UID, the position information, and the detection time input at step S1502. When the information that is not included in the pieces of information obtained at steps S1502 and S1503 is defined as the information to be transmitted, the notification information generating unit 107 obtains the necessary information by making a request to the filter DB manager 108. The notification information generating unit 107 then outputs the obtained information as the notification information, together with the "transmission destination", the "service type" and the like retained by the filter to the notification processor 109.

The notification processor 109 calls a program for transmitting the information in the transmission protocol specified by the input "service type" (step S1508).

When "cryptography" is input, the notification processor 109 encrypts the notification information by using a method specified by the "cryptography" (step S1509). When the "cryptography" is not input, the notification processor does not perform specific processing.

The notification processor 109 transmits the notification information to the address specified by the "transmission destination" (step S1510). Returning to step S1505, the notification processor 109 determines whether the processing for all filters in the list has finished.

The information appropriate to each application can be transmitted according to the process procedure described above. In the above flowchart, the record information or update information input from the notification information generating unit 107 and the notification processor 109 is only one. However, when pieces of position information are received, the process procedure from step S1503 to step S1510 is repeated for each of the input record information or update information.

The process procedure is an example of a procedure for generating the notification information and transmitting the notification information, when it is determined by monitoring that there is a generation request of notification information from another configuration in this embodiment. However, the present invention is not limited thereto.

Figure 16:
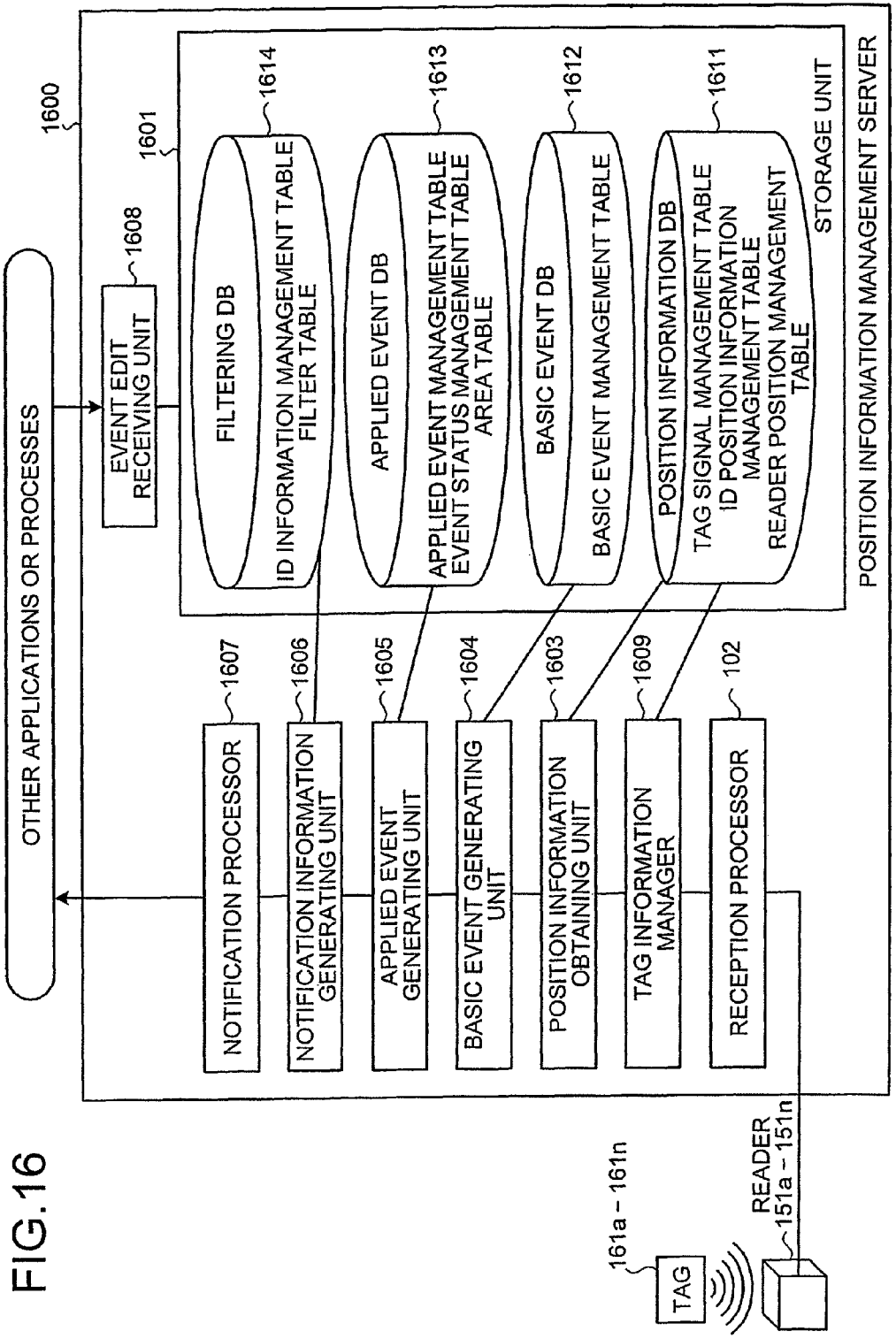
FIG. 16 is a configuration block diagram of a position information management system according to a second embodiment of the present invention.

FIG. 16 is a configuration block diagram of a position information management system according to a second embodiment of the present invention. The position information management system according to the second embodiment has the same configuration as that of the position information management system in this embodiment, except that the position information management server 100 in this embodiment is replaced by a position information management server 1600 that performs different processing.

The position information management server 1600 generates an event, when the position information and the like that can be obtained from the information transmitted from the readers 151a to 151n and the measured signal strength match with the preset event generation condition, and transmits the notification information generated based on the event to each application.

This event is generated corresponding to a change of a signal detected from the active tags 161a to 161n or an event change such as the lapse of time, and in other words, corresponds to event information. In this embodiment, a basic event and an applied event are used as the event, however, the present invention is not limited to use these events and various kinds of events can be prepared. The basic event and the applied event will be explained later.

The position information management server 1600 includes a storage unit 1601, the reception processor 102, the tag information manager 109, a position information obtaining unit 1603, a basic event generating unit 1604, an applied event generating unit 1605, a notification information generating unit 1606, a notification processor 1607, and an event edit receiving unit 1608. The position information management server 1600 stores the position information obtained based on the identification signal transmitted from the readers 151a to 151n and the measured signal strength, generates a basic event when the position information satisfies the condition for generating the basic event, generates an applied event when the generated basic event satisfies the condition for generating the applied event, and generates the notification information based on the generated applied event to transmit the notification information to another application or process.

The basic event is information to be generated when a basic event change such as the lapse of time or detection of an active tag is detected. That is, the basic event corresponds to the first event information.

The applied event is information to be generated when it is determined that a complicated condition for an event that can be determined based on the basic event and the generated applied event, such that the active tag continues to stay at a predetermined place, is satisfied.

The storage unit 1601 includes a position information DB 1611, a basic event DB 1612, an applied event DB 1613, and a filtering DB 1614. The storage unit 1601 can be formed of all sorts of storage means generally used, for example, a hard disk drive (HDD), an optical disc, and a memory card.

The position information DB 1611 stores a reader position management table, a tag signal management table, and an ID position information management table. FIG. 17 is a structural diagram of the reader position management table. The reader position management table shown in FIG. 17 is the same as the reader position management table explained in this embodiment, except that the coordinate system is deleted, and hence, the explanation thereof is omitted. The reader address can be obtained by referring to the header of a packet transmitted from the reader.

FIG. 18 is a structural diagram of the tag signal management table. As shown in FIG. 18, the tag signal management table retains IDs, reader IDs, signal strength, and detection time in association with each other. That is, the tag signal management table manages the information obtained by associating the information transmitted from the readers 151a to 151n with the detection time as a record. The ID is used for specifying objects attached with the active tags 161a to 161n.

FIG. 19 is a structural diagram of the ID position information management table. As shown in FIG. 19, the ID position information management table retains the ID, position information, and detection time in association with each other. The respective records retained in the ID position management table are generated based on the records retained in the reader position management table and the tag signal management table. Thus, by storing the position information, a change in the position information of the object can be detected, and a distance between a plurality of objects and the like can be calculated.

The basic event DB 1612 stores a basic event management table. FIG. 20 is a structural diagram of the basic event management table. In the basic event DB table 1612, the generated basic event and an event generation condition are retained in association with each other. In FIG. 20, the condition is retained in a format that can be recognized by the position information management server 1600. The same thing applies to FIGS. 21 and 22. The event generation condition retained in the basic event management table corresponds to basic generation condition information.

The basic event shown in FIG. 20 is explained. 'DETECTED' is generated every time the position information of the detected active tag is obtained. 'UNDETECTED' is generated when the active tag cannot be detected or when the active tag has been detected, however, the position information cannot be obtained. 'POS_UPDATE' is generated when the position information management table is updated by the position information of the obtained active tag. 'POS_CHANGE' is generated when the ID specifying the obtained position information has been already retained as a record in the position information management table, and the position information retained by the record is different from the obtained position information. 'TIME_CYCLE' is an event generated periodically for every predetermined cycle time. For the predetermined cycle time, time interval for notifying the information periodically to the application, for example, one second or the like is set.

When the events 'DETECTED', 'UNDETECTED', 'POS_UPDATE', and 'POS_CHANGE' are generated, these events include ID, position information, and detection time. The event 'TIME_CYCLE' is generated, including the current time, and the ID and position information retained by a record updated since the last transmission in the position information management table, in this embodiment, but can be generated including only the current time according to need. In this embodiment, the events generated in the present invention are not limited to the events described above, and an appropriate event is set according to the information or the like requested by the application at the notification destination.

The applied event DB 1613 stores an applied event management table, an event status management table, and an area table.

FIG. 21 is a structural diagram of the applied event management table. In the applied event management table, the event name, trigger event, event generation condition, argument, transmission data, term of validity, and effective flag are retained in association with each other. The applied event generating unit 1605 described later generates applied events by using the table shown in FIG. 21.

The applied event management table includes information in which the generated applied event and generation condition are retained in association with each other, and corresponds to event correspondence information. Furthermore, the event generation condition in the applied event management table corresponds to event generation condition information. The trigger event is used as a comparison target at the time of generating the event, and corresponds to target event information.

The event name indicates the name of applied event generated when the generation condition is satisfied. The trigger event indicates an event, which becomes a trigger for determining whether to generate the applied event, and is used as a trigger both for the basic event and the applied event. The event generation condition indicates the condition for generating the applied event. The argument retains a value or the like to be used in the event generation condition. For example, in the case that the event generation condition is "when it is detected at a specified position", and the argument is "ID001, (10, 30)", when the active tag of ID001 is detected at a coordinate (10, 30) indicating the specified position, it is determined that the active tag matches with the event generation condition. Furthermore, when the argument is not set, it means that an optional value can be used. For example, when the event generation condition is as described above, and the argument is "(10, 30)", when an optional active tag is detected at the coordinate (10, 30) indicating the specified position, it is determined that the active tag matches with the event generation condition.

The transmission data is information included in the generated event. The term of validity indicates the term during which the applied event indicated by the record is generated. When the term is exceeded, an event is not generated by using the record. In the field of term of validity, the term of validity can be specified at the time of adding an event by the event edit receiving unit 1608. The event with expired term of validity is deleted, or an effective flag is set to '0' and nullified.

The effective flag indicates whether the record is effective, and in the case of '1', it indicates valid, and an event is generated when the generation condition indicated by the record is satisfied. In the case of '0', it indicates invalid, and hence, an event is not generated by the record. The applied event generation method using the table will be explained later.

FIG. 22 is a list of applied events registered as a record in the applied event management table shown in FIG. 21. From the list shown in FIG. 22, the argument, the term of validity, the effective flag, and the like are set as required by the application and process as the transmission destination of the notification information, and registered in the applied event management table. These applied events are not only registered in the applied event management table as the events to be generated, but also set as the event generation condition.

For example, in the applied event management table shown in FIG. 21, in 'AWAY_AREA' event in No. 9 record, 'LASTING' event is set as the event generation condition. Accordingly, when the event generation condition of 'LASTING' event is satisfied, the 'AWAY_AREA' event is generated.

FIG. 23 is a structural diagram of the event status management table. As shown in FIG. 23, time and generated event are retained in association with each other. Accordingly, the event generated at each time period can be recognized. In FIG. 23, although not shown to improve the visibility, the event retains not only the event name but also the information retained by the event, for example, the ID, position information, and detection time. Accordingly, it can be specified at which ID or at which position these events are generated. The event retained in the table can be any event, and in this embodiment, the basic events and the applied events are registered. Only one of the basic events and the applied events can be registered according to the use mode.

FIG. 24 is a structural diagram of the area table. In the area table, area name and corresponding area are retained in association with each other. The area retains the shape of the area and a coordinate for specifying the area. For example, when a rectangular area is described in the position field, it indicates that the area is rectangular, and when the area is rectangular, the area retains a position coordinate of two points for specifying the rectangle. The area shape can be other than a rectangle, and for example, a round area can be considered. In the case of the round area, it can be considered to retain the position coordinate of the center and the radius thereof.

The filtering DB 1614 stores an ID information management table and a filter table. The ID information management table retains ID, name, and type in association with each other, and has the same configuration as that of the UID information management table shown in FIG. 22 in this embodiment, except that the 'UID' field is changed to an 'ID' field. By retaining the type in association with the ID, filtering based on the attribute of an object can be performed.

FIG. 25 is a structural diagram of the filter table. In the filter table, events, filter types, IDs, positions, service types, cryptography, transmission destinations, and transmission information are retained in association with each other. The "event" field indicates that the information is transmitted when the event matches with the generated applied event, and corresponds to notified event information. The fields of "filter type", "ID", and "position" indicate filtering conditions, and the information is transmitted only when the conditions described in these fields are satisfied. That is, these fields correspond to notification condition information. When there is no description in these fields, it is assumed that a filtering condition is not particularly set. The "service type" field retains a transmission protocol at the time of transmission. The "cryptography" field retains an encryption method at the time of transmission to the application. The "transmission destination" field indicates a transmission destination of information, and an application for processing the information is present at the transmission destination. The "transmission information" field retains the type of information to be transmitted. Accordingly, only the information required for each application can be transmitted. In other words, when the filtering condition retained in a record is satisfied, the information retained by the "transmission information" is obtained, and transmitted to the "transmission destination" retained by the record in association with each other, by using the transmission protocol set in the "service type". The transmitted information can be understood by referring to the associated "transmission information" field. Accordingly, a transmission condition can be set for each application, and only when the condition is satisfied, the information can be transmitted.

Returning to FIG. 16, the reception manager 102 has the same configuration as that of the reception manager 102 in this embodiment, and hence, the explanation thereof is omitted.

The tag information manager 109 performs processing with respect to respective tables retained by the device DB. The tag information manager 109 in this embodiment specifies a reader ID based on the IP address of the reader input from the reception processor 102, by referring to the reader position management table, and updates a record, whose ID matches with the reader ID in the tag signal management table, based on the information in which the specified reader ID is associated with the input ID, signal strength, and detection time. Accordingly, in the tag signal management table, the associated reader ID and ID can retain the signal strength and detection time according to the newest detection information. The tag information manager 109 is the same as the tag information manager 103 in this embodiment in other processing, and hence, the explanation thereof is omitted.

The position information obtaining unit 1603 confirms whether the tag signal management table has been updated for every predetermined period, and when the tag signal management table has been updated, the position information obtaining unit 1603 obtains an ID that can be specified by the updated record, to obtain the position information of the active tags 161*a* to 161*n* based on the information of the record retaining the ID information. The position information can be obtained based on the reader ID retained in the tag signal management table, the reader ID retained in the reader position management table, and the position information of the reader. In this embodiment, the predetermined period is one second, and the position information obtaining unit 1603 confirms the update of the tag signal management table for every second. The obtained position information corresponds to obtained position information.

When only one reader has detected the active tag, the position information obtaining unit 1603 designates the coordinate system and the position information of the reader having detected the active tag as the position information indicating the position of the active tag 161*b*.

When there is a plurality of readers that have detected the active tags, the position information obtaining unit 1603 can use any method of various position calculation methods proposed at present, as explained in this embodiment.

The position information obtaining unit 1603 updates the position information management table, associating the obtained ID, position information, and detection time with each other. At this time, the position information obtaining unit 1603 confirms whether the position has been changed from the position information updated previously. The position information obtaining unit 1603 then outputs to the basic event generating unit 1604 whether the position information management table has been normally updated, and whether the position has changed from the position information updated previously, based on these obtained ID, position information, and detection time.

When the input information matches with the event generation condition retained in the basic event management table shown in FIG. 20, the basic event generating unit 1604 generates the basic event, and outputs the basic event to the applied event generating unit 1605. There is no particular limitation on the conditions set in the event generation condition, and for example, the position information of an object, a time, and an area for detecting the active tag, and condition based on the active tag itself can be considered. The event generation condition retained by the basic event management table corresponds to the first event condition.

In this embodiment, the basic event generating unit 1604 generates an event for every predetermined event generation interval. As the generation interval, appropriate time is set based on the needs of the application to be notified or the processing ability of the position information management server 1600. In this embodiment, the event generation interval is set to be every one second.

Upon reception of the position information and the like within the event generation interval, the basic event generating unit 1604 generates an event based on the position information and the like. In this embodiment, the basic event generating unit 1604 generates the 'DETECTED' event upon reception of the position information and the like, and incorporates the ID, position information, and detection time in the event. When the position information management table can be normally updated, the basic event generating unit 1604 generates 'POS_UPDATE' event, and incorporates the detected ID, position information, and detection time therein. When the position has changed from the position information updated previously, the basic event generating unit 1604 generates 'POS_CHANGE' event, and incorporates the detected ID, position information, and detection time therein.

Even when the basic event generating unit 1604 has not received the position information and the like within the event generation interval, if the event generation condition is satisfied, the basic event generating unit 1604 generates the basic event. In this embodiment, when the position information and the like are not input within a retention period defined to retain the information detected after the previous detection of the active tag, and within the generation interval this time, the basic event generating unit 1604 generates 'UNDETECTED' event. The basic event generating unit 1604 incorporates the ID, which was detected within the retention period but has not been detected this time, and the position information and detection time detected previously therein. The basic event generating unit 1604 further generates 'TIME_CYCLE' event for every cycle time. In this embodiment, the retention period is set to three seconds, and the cycle time is set to be one second.

FIG. 26 is an explanatory diagram of a correlation example between the position information and the like input from the position information obtaining unit and an event generated by the basic event generating unit 1604. The basic event generating unit 1604 generates an event for every event generation interval. In FIG. 26, it is assumed that the active tag to be detected is only one for easy explanation, and description of the ID and the like of the active tag is omitted. In the environment shown in FIG. 26, since the condition of a radio wave is bad, an identification signal sent from the active tag can be detected only once in several seconds. The position information obtaining unit 1603 obtains the position information based on the predetermined information such as the identification signal detected under such an environment, and outputs the position information to the basic event generating unit 1604. During the period when the identification signal from the active tag cannot be detected, the tag signal management table is not updated. Hence, the position information obtaining unit 1603 does not output the position information.

The basic event generating unit 1604 generates an event for every event generation interval (one second), regardless of whether the position information and the like are input. That is, the basic event generating unit 1604 generates the event under a condition that one second has elapsed, and the time elapsed since the previous generation corresponds to elapsed time information. The basic event generating unit 1604 generates 'TIME_CYCLE' event every time, regardless of the position information and the like being input. At event generation time 1301, since the position information and the like are not input, the basic event generating unit 1604 generates 'UN_DETECTED' event.

At event generation time 1302, since the position information and the like are input, the basic event generating unit 1604 generates 'DETECTED' event, and further generates 'POS_UPDATE' event indicating that the position information management table has been updated by the obtained position information.

The position information input at event generation time 1303 is different from the position information input at event generation time 1302 of the previous time. Therefore, the basic event generating unit 1604 generates 'POS_CHANGE' event in addition to 'DETECTED' event and 'POS_UPDATE' event. These generated events are input to the applied event generating unit 1605.

Since the basic event generating unit 1604 is provided, the basic event corresponding to an event change can be generated. The applied event generating unit 1605 uses the basic event as a trigger or the like, to generate the applied event based on a more complicated condition.

The applied event generating unit 1605 generates the applied event by using the generated event as a trigger, when the generated event matches with the event generation condition retained in the applied event management table shown in FIG. 21. The event used as a trigger is not particularly limited, and either the basic event or the applied event can be used as a trigger in this embodiment.

The applied event generating unit 1605 can use the information retained in the other tables for determining whether the generated event matches with the event generating condition retained in the applied event management table. In this embodiment, the applied event generating unit 1605 determines whether the event generation condition is satisfied, by using the area table retained in the applied event DB 1613 and the information retained in the event status management table, according to need. Accordingly, the event generation condition can be set in detail.

In this embodiment, the applied event generating unit 1605 generates an event for each predetermined event generation interval as in the basic event generating unit 1604. In this embodiment, the event generation interval by the applied event generating unit 1605 is assumed to be every one second.

The applied event generating unit 1605 also outputs the input basic event and the generated applied event to the notification information generating unit 1606. The applied event generating unit 1605 determines whether the generated applied event matches with the event generation condition retained in the applied event management table, by using the generated applied event as a trigger, and when the generated applied event matches therewith, generates an applied event.

The applied event generating unit 1605 registers the input basic event and the generated applied event in association with the current time in the record in the event condition management table, for each event generation interval. At the time of registering the event in the event condition management table, the applied event generating unit 1605 registers not only the event name, but also the information included in the event, for example, ID, position information, and detection time.

An example when the applied event is generated by using the applied event management table shown in FIG. 21 is explained below. When 'DETECTED' event is input from the basic event generating unit 1604, since the event matches with the trigger event in the first, the second, and the fourth records in the applied event management table, the applied event generating unit 1605 generates an applied event for each record, if the event generation conditions of these records are satisfied. It is assumed that the ID included in the 'DETECTED' event is ID001 and the position information is (10, 10). In this case, the event generation conditions of the first and the second records and the condition specified by the argument are not satisfied, and hence, 'PRESENT' event is not generated.

On the other hand, the position information (10, 10) is specified as the meeting room 1 from the area table shown in FIG. 24. That is, the event generation condition of the fourth record, "when ID001 is detected in the meeting room 1" by the argument and the event generation condition is satisfied. Accordingly, the applied event generating unit 1605 generates 'PRESENT_AREA' event. The generated event includes ID001, the meeting room 1, and the time when the tag is detected, which are the pieces of information specified by the "transmission data". The applied event generating unit 1605 needs to obtain a coordinate area indicating the 'meeting room 1' from the area table, at the time of determination.

The applied event generating unit 1605 then determines whether there is a record using the generated 'PRESENT_AREA' event as a trigger. When it is determined there is, the same processing as above is performed to determine whether the event generation condition in the record is satisfied. In the applied event management table shown in FIG. 21, there are 'STAY_AREA' as an applied event and 'PRESENT_AREA' as a trigger event thereof. Therefore, when referring to the event generation condition, the event generation condition is LASTING (PRESENT_AREA), the argument is ID001 and 10 minutes. When these event generation conditions are satisfied, the 'STAY_AREA' event is generated.

'LASTING' event is an event generated when a specified event is continued for a specified period or more, that is, when the same event is continuously generated at an interval of one second during the specified period. In other words, the 'LASTING' event is an event generated under a condition that the specified event has been detected 300 times, designating the specified period as 5 minutes, that is, an event generated when the specified event has been detected for a predetermined number of times within a specified period.

By enabling setting of the event generation condition, the 'STAY_AREA' event can be registered, and information indicating that a specific person or an optional person has a meeting can be notified on the real time basis, as a service that can be provided by the position information management server 1600. The specific person or optional person can be changed by setting the argument.

The applied event generating unit 1605 outputs the generated event and the input event to the notification information generating unit 1606, and registers the generated 'PRESENT_AREA' event and the input 'DETECTED' event in the event status management table.

The applied event generating unit 1605 can generate one applied event based on a plurality of events. For example, in 'CLOSE' event shown in FIG. 21, the event generation condition is "when there is a plurality of tags nearby", and the argument is 4, 3. Therefore, when four active tags are present within 3 meters, the event generation condition is satisfied. Since the trigger event is 'POS_UPDATE', when four or more 'POS_UPDATE' events are input within the event generation interval, and the position information retained by these events indicates 3 meters, the applied event generating unit 1605 determines that the event generation condition in the record is satisfied and generates the 'CLOSE' event. Thus, since one event can be generated by setting a plurality of events as the condition, an event having a more complicated condition can be generated.

Furthermore, an example where the applied event generating unit 1605 refers to the event status management table to determine whether the event generation condition is satisfied is explained. For example, in the 'STAY_AREA' event, the event generation condition is 'LASTING ('PRESENT_AREA')', and the argument is ID001 and 10 minutes. To confirm whether this event generation condition is satisfied, the applied event generating unit 1605 refers to the event status management table to confirm whether the 'PRESENT_AREA' event including ID001 has been registered continuously for 10 minutes. When the event has been registered continuously for 10 minutes, the applied event generating unit 1605 determines that the event generation condition is satisfied, and generates the 'STAY_AREA' event. Since there is no applied event using 'STAY_AREA' as a trigger in the applied events retained in the applied event management table shown in FIG. 21, the applied event generating unit 1605 does not determine whether the event generation condition is satisfied by using the 'STAY_AREA' event. The generated 'STAY_AREA' event includes UID001, area, time when the tag is detected, and the duration after having entered the area.

FIG. 27 is an example of a record registered in the event status management table, when the 'STAY_AREA' event is generated. As shown in FIG. 27, the 'STAY_AREA' event, the 'PRESENT_AREA' event as a trigger thereof, and the 'DETECTED' event as a trigger thereof are registered together with 'POS_UPDATE' indicating update at the same time.

An example where the applied event generating unit 1605 refers to the event status management table to determine whether the event generation condition is satisfied is explained. There is 'EV_CHANGE' event as an event required to be determined whether it satisfies the event generation condition by referring to the event status reference table. As shown in the list shown in FIG. 22, when there is a change between the event generated at the previous time and the event generated this time, this event is determined to satisfy the event generation condition. Since an event can be generated by comparing the event previously generated with the event generated this time, an event having a more complicated condition can be generated.

As the event in which the 'EV_CHANGE' event is set as the event generation condition, there is 'LEAVE' event of the eighth record in the applied event management table shown in FIG. 21. In the 'LEAVE' event, 'ABSENT_AREA" is set as a trigger event, 'EV_CHANGE (PRESENT_AREA, ABSENT_AREA)' is set as the event generation condition, and 'reception room' is set as the argument.

In other words, when the applied event generating unit 1605 generates the 'ABSENT_AREA" event, the applied event generating unit 1605 determines whether the event generation condition of the 'LEAVE' event is satisfied, by using the 'ABSENT_AREA" event as a trigger. When the 'ABSENT_AREA" event generated this time includes the information of the reception room, the event generation condition is satisfied. In this case, the applied event generating unit 1605 refers to the event status management table to confirm whether the 'PRESENT_AREA' event including the information of the reception room was previously generated. When there is the 'PRESENT_AREA' event including the information of the reception room previously generated in the event status management table, the applied event generating unit 1605 determines that the event generation condition is satisfied, and generates the 'LEAVE' event. It is of course necessary that the ID retained by the 'ABSENT_AREA" event generated this time and the ID retained by the 'PRESENT_AREA' event previously generated match with each other.

FIG. 28 is an example of the event status management table in which the 'LEAVE' event is retained. When the 'PRESENT_AREA' event was previously generated, and the 'ABSENT_AREA" event is generated this time, the 'LEAVE' event is generated. Thereafter, even if the 'ABSENT_AREA" event is generated, the 'LEAVE' event is not generated.

Returning to FIG. 16, the notification information generating unit 1606 generates notification information based on the basic event and the applied event input from the applied event generating unit 1605. In this embodiment, the notification information generating unit 1606 generates notification information satisfying the condition retained in the filter table from the input event. It is assumed that the generated notification information includes an event name, thereby the application at the transmission destination can specify in which case the notification information has been generated. The notification information generating unit 1606 performs filtering by using the filter table shown in FIG. 25, and transmits the transmission information to the transmission destination.

The notification information generating unit 1606 can generate the notification information when not only the information retained by the input event such as the basic event or the applied event, but also the information obtained based on the information retained by the event satisfy the condition retained in the filter table. For example, the notification information generating unit 1606 compares the ID included in the event with the ID retained in the ID information management table, to obtain record information corresponding to the input event, and uses the information retained by the obtained record to determine whether the condition retained in the filter table is satisfied. When the retained condition is satisfied, the notification information generating unit 1606 generates the notification information.

For example, the notification information generating unit 1606 uses the ID included in the 'POS_UPDATE' event as a key, to obtain record information from the ID information management table. Accordingly, the name and type corresponding to the event can be obtained. Filtering becomes possible by using these conditions as the conditions set in the filter table.

Furthermore, the notification information generating unit 1606 can set not only the information retained by the event but also the associated information obtained from the table as the transmission information. In the above example, the name and type obtained from the ID information management table can be set as the information to be transmitted.

The condition in the filter table is explained below. For example, when the "ID" in each record in the filter table matches with the ID included in the basic event or the applied event, the condition defined by the "ID" is satisfied. Thus, when the condition retained by each record is satisfied, the notification information generating unit 1606 generates the notification information.

As another example, a case is explained, that the notification information generating unit 1606 obtains information included in the input event and the information from other tables, to determine whether the condition is satisfied. First, the notification information generating unit 1606 compares the "ID" included in the input event with the "ID" field in the ID information management table, to obtain matching record information. When the "type" included in the obtained record information matches with the "filter type" in each record in the filter table, the condition defined by the "filter type" is satisfied. Thus, when the condition retained by each record is satisfied, the notification information generating unit 1606 generates the notification information.

When the condition of the record in the filter table is satisfied, the notification information generating unit 1606 refers to the "transmission information" field of the record indicating the filter, to obtain the information described in the "transmission information", and adds the obtained information to the notification information. Accordingly, notification information including the information appropriate to each application can be generated.

In this embodiment, the information described in the "transmission information" field can be the information included in the input event, or information obtainable from the correspondence with the input event. The information obtainable from the correspondence with the input event includes information that can be obtained from a table group retained in the filtering DB 1614. For example, the information can be set as the condition for transmitting the "name", the "type", and the like retained in the ID information management table.

Accordingly, the notification information generating unit 1606 can obtain information described in the "transmission information" as the information required for generating the notification information.

The notification information generating unit 1606 outputs the generated notification information to the notification processor 1607. The notification information generating unit 1606 further outputs the "transmission destination" and the "service type" retained by the record in the filter table at the time of outputting the notification information. Furthermore, when the filter retains cryptography, the notification information generating unit 1606 outputs the cryptography together with the notification information.

When the notification information, the "transmission destination" and the "service type" are input from the notification information generating unit 1606, the notification processor 1607 calls the program for performing transmission processing according to the transmission protocol retained by the service type, to transmit the notification information to the transmission destination. When the cryptography is input together with the notification information, the notification processor 1607 encrypts the notification information by using the input encryption method and transmits the notification information. As the input encryption method, any method can be used as explained in this embodiment.

The event edit receiving unit 1608 receives a request from the application or process connected to the position information management server 1600, and performs addition, change, or deletion of records in the respective tables to transmit the notification information appropriate to the request. In this embodiment, the event edit receiving unit 1608 adds a record of the applied event management table or deletes or changes the corresponding record in the applied event DB 1613, to set the condition for generating the notification information.

Furthermore, when the information of the event name selected from the applied event list shown in FIG. 22 and an argument for setting the event generation condition is input from another application as a record to be added, the event edit receiving unit 1608 can register an applied event. Accordingly, an applied event appropriate to a request from another application can be generated.

When having received a request for deleting or changing the registered event generation condition from another application, the event edit receiving unit 1608 deletes or changes the record in the applied event management table, which can be specified by the information received together with the request. The information received together with the request can be any information, so long as it can specify a record, and for example, an event name and an argument can be considered. In the case of a change, the event edit receiving unit 1608 receives a condition for the change together with the information, and changes a record according to the condition.

Furthermore, at the time of deleting the record in the applied event management table, the event edit receiving unit 1608 examines the dependency, and when there is a record in which the record to be deleted is used as the event generation condition such as a trigger event, the event edit receiving unit 1608 can suspend the use of the record by turning off the effective flag of the record. At the time of newly adding the record, the event edit receiving unit 1608 examines the dependency, and when there is a record used as the event generation condition in the record to be generated newly, the event edit receiving unit 1608 can perform processing such as turning on the effective flag. According to the processing, the load on the event generation processing can be reduced, and the labor at the time of generating the event can be reduced.

When the filtering condition, the transmission destination, and the like are input from another application, the event edit receiving unit 1608 registers a record based on the information input to the filter table in the filtering DB 1614.

Furthermore, the event edit receiving unit 1608 receives a request for a change or deletion of a filter, in addition to a request for filter registration. The event edit receiving unit 1608 deletes or changes the corresponding record in the filter table, by using the information specifying the filter received together with the request, and in the case of a change, by using the information indicating the change condition. The condition for specifying the filter can be any condition, so long as it can specify a record such as the "transmission destination" field and the "event" field in the service filter table.

Thus, since the event edit receiving unit 1608 can register an event to be generated and the filter, or change or delete the event or filter, the event edit receiving unit 1608 can handle a situation where another application requests regular transmission of information, as well as a situation where another application requests transmission of information only when it is necessary.

Figure 29:
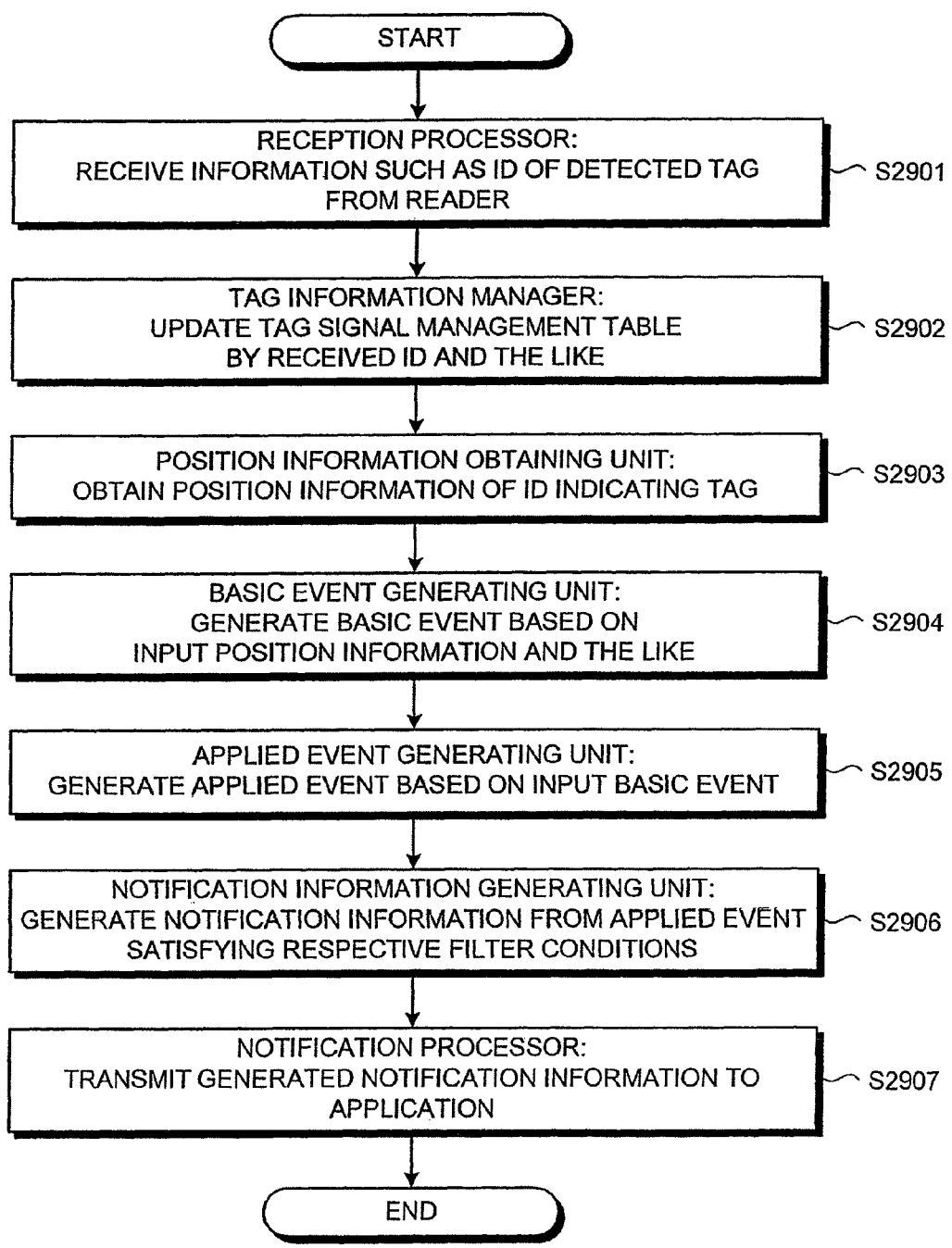
FIG. 29 is a flowchart of a process procedure performed by the position information management server according to the second embodiment, since having received information such as an ID from a reader until notifying the application.

The processing in the position information management server 1600 according to the second embodiment configured as described above is explained, since having received information such as an ID from the reader until transmitting the notification information to the application. FIG. 29 is a flowchart of a process procedure performed by the position information management server 1600 according to the second embodiment.

First, the reception processor 102 receives the information such as the tag ID of the active tags 161a to 161n detected by the readers 151a to 151n from the readers 151a to 151n (step S2901).

The tag information manager 103 updates the tag signal management table, associating the tag ID received by the reception processor 102, the reader ID, the signal strength, and the detection time of the reader having sent the information with each other (step S2902).

The position information obtaining unit 1603 then confirms whether the tag signal management table has been updated by the tag information manager 109 for every second. When the tag signal management table has been updated, the position information obtaining unit 1603 obtains the ID indicating the active tag detected from the updated record, obtains the record retaining the information of the obtained ID, and calculates the position information based on the information of the obtained record, to obtain the position information of the active tags 161a to 161n (step S2903).

When the condition preset by the input position information and the like or the lapse of predetermined time is satisfied, the basic event generating unit 1604 generates a basic event associated with the satisfied condition (step S2904).

Subsequently, when the input basic event or the generated applied event matches with the event generation condition retained in the applied event management table, the applied event generating unit 1605 generates an applied event, using the input basic event or the generated applied event as a trigger (step S2905). The applied event generating unit 1605 outputs all of the input basic events and generated applied events to the notification information generating unit 1606.

When the information included in the input event and information associated with the information satisfy the filter condition, the notification information generating unit 1606 obtains information specified by the "transmission information" field retained by the filter, to generate notification information, associating the pieces of obtained information with each other (step S2906). In other words, when the information relating to the input event does not satisfy the filter condition, the notification information is not generated.

The notification processor 1607 transmits the generated notification information to the transmission destination specified by the "transmission destination" field retained by the filter (step S2907). At the time of transmission, the notification processor 109 transmits the notification information by using a transmission protocol retained by the service type of the filter, and when the filter cryptography is defined, encrypts the information by using the defined cryptography.

The information appropriate to each application can be transmitted according to the process procedure described above, after having detected the active tags 161a to 161n. The process procedure is an example of the procedure since having received the information such as the ID until the notification information is generated to perform notification processing according to the second embodiment, and the present invention is not limited thereto.

Figure 30:
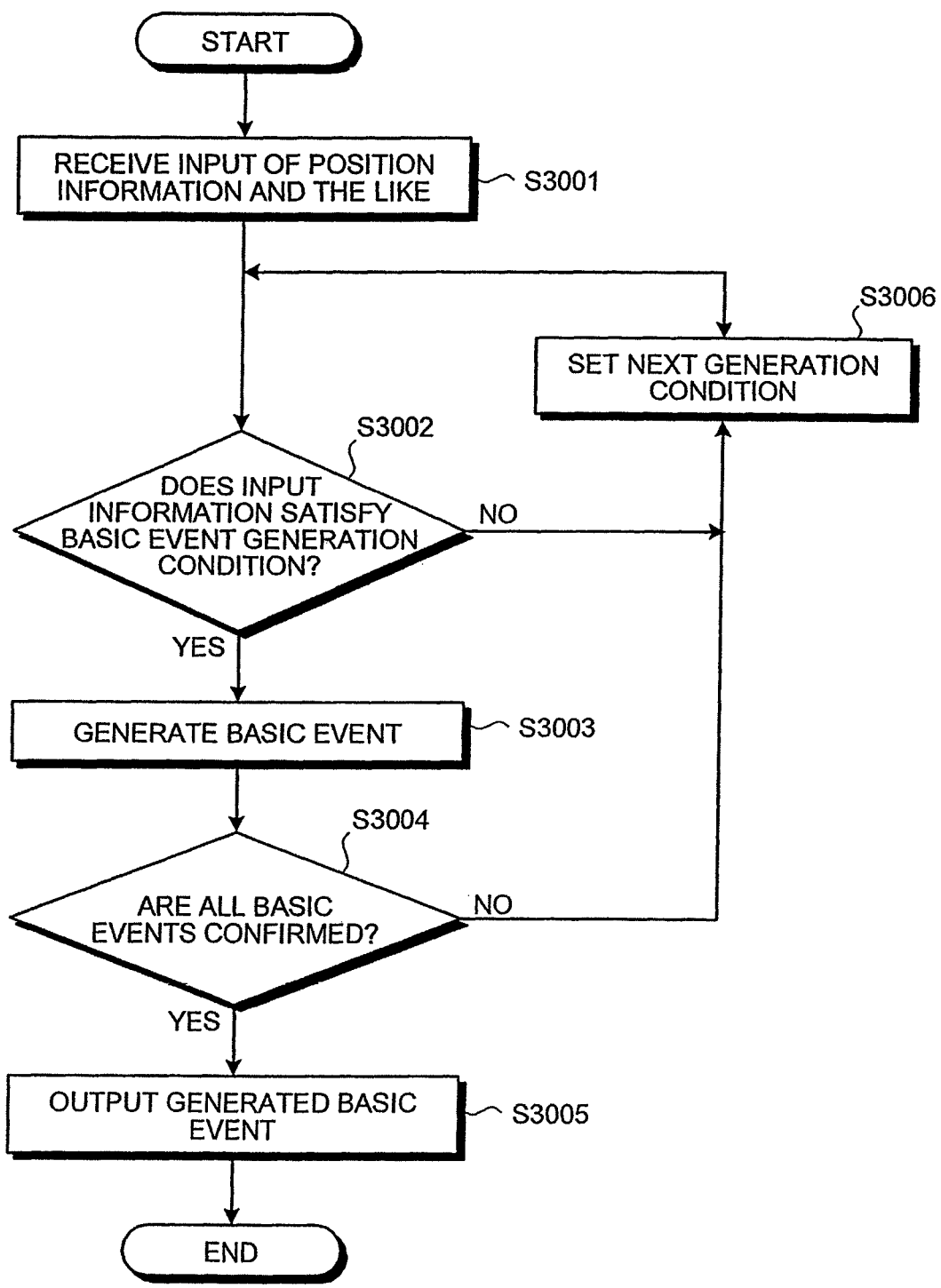
FIG. 30 is a flowchart of a process procedure performed by a basic event generating unit according to the second embodiment, since an input of the position information and the like until an output of the generated basic event.

The processing by the basic event generating unit 1604 in the position information management server 1600 according to the second embodiment configured as described above is explained, since an input of the position information or the like until an output of the generated basic event. FIG. 30 is a flowchart of a process procedure performed by the basic event generating unit 1604 according to the second embodiment.

First, the basic event generating unit 1604 receives an input of the position information or the like of the ID updated by the position information obtaining unit 1603 (step S3001).

When one second has elapsed after an event was generated at the previous time, the basic event generating unit 1604 determines whether the input information such as position information or the like of the ID received at step S3001 satisfies the event generation condition set in the record in the basic event management table (step S3002).

When having determined that the event generation condition is satisfied (step S3002: Yes), the basic event generating unit 1604 generates an event based on the event name and the like associated with the event generation condition (step S3003). The basic event generating unit 1604 includes the position information and the information such as ID at the time of generating the event.

The basic event generating unit 1604 then determines whether all the event generation conditions retained in the basic event management tale have been confirmed (step S3004).

When having determined that all the event generation conditions have been confirmed (step S3004: Yes), the basic event generating unit 1604 outputs the generated basic event (step S3005).

When having determined that the event generation conditions is not satisfied (step S3002: No), and that the confirmation for all the event generation conditions has not finished yet (step S3004: No), the basic event generating unit 1604 sets the next record of the records retaining the event generation condition, which is a determination target at step S3002, as a determination target (step S3006). Thereby, the next event generation condition is set, and the basic event generating unit 1604 performs processing for determining whether this event generation condition is satisfied at step S3002.

The basic event can be generated based on the input position information and the like according to the process procedure described above. The process procedure is an example of a procedure since an input of the position information and the like until an output of the generated basic event according to the second embodiment, and the present invention is not limited thereto.

Figure 31:
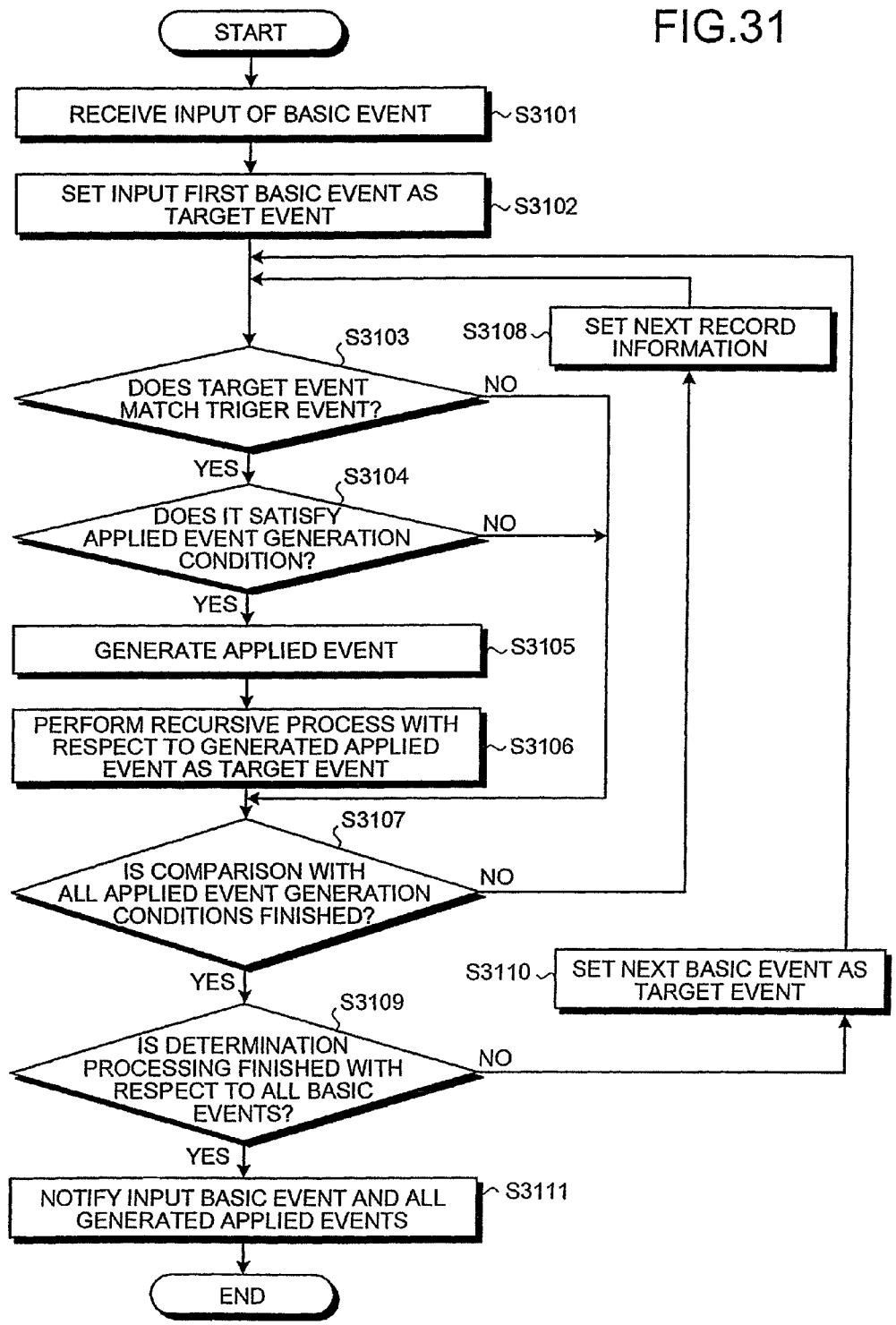
FIG. 31 is a flowchart of a process procedure performed by the applied event generating unit according to the second embodiment, since having received an input of a basic event until outputting the input basic event and the generated applied event.

The processing by the applied event generating unit 1605 according to the second embodiment configured as described above is explained, since reception of an input of the basic event until an output of the input basic event and the generated applied event. FIG. 31 is a flowchart of a process procedure performed by the applied event generating unit 1605 according to the second embodiment.

First, the applied event generating unit 1605 receives an input of the basic event from the basic event generating unit 1604 (step S3101).

The applied event generating unit 1605 then sets the first input basic event as an event to be compared (step S3102).

The applied event generating unit 1605 determines whether the event name of the basic event set as the target event matches with an event name of the trigger event retained in the applied event management table (step S3103). At the time of first determination, the applied event generating unit 1605 sets the first record retained in the applied event management table as a determination target, to make a determination by using the trigger event in the first record.

When having determined that the event names match with each other (step S3103: Yes), the applied event generating unit 1605 determines whether the generation condition of the applied event associated with the trigger event is satisfied based on the information retained by the basic event set as the target event and the information obtained from the correspondence with the basic event (step S3104).

When having determined that the generation condition of the applied event is satisfied (step S3104: Yes), the applied event generating unit 1605 generates an applied event (step S3105).

When having determined that the generation condition of the applied event is not satisfied (step S3103: No), and that the event names do not match with each other (step S3103: No), the applied event generating unit 1605 does not perform particular processing.

The applied event generating unit 1605 then sets the generated applied event as a target event, and performs a recursive process for the processing of from step S3103 to step S3108 (step S3106). Thereby, an applied event based on the applied event is generated.

Subsequently, the applied event generating unit 1605 determines whether the comparison with the generation conditions of the applied event of all records retained in the applied event management table has finished (step S3107).

When having determined that the comparison with the generation conditions of the applied event has not finished (step S3107: No), the applied event generating unit 1605 sets the next record retained in the applied event management table as a determination target (step S3108), to make a determination by using the trigger event of the record set as the determination target at step S3103.

The applied event generating unit 1605 then determines whether the determination processing is performed with respect to all the input basic events (step S3109).

When having determined that the determination processing has not finished yet with respect to all the input basic events (step S3109: No), the applied event generating unit 1605 selects a basic event that has not been a target of the determination among the input basic events, and sets the selected basic event as a target event of the next determination (step S3110). The applied event generating unit 1605 determines whether the event name of the set basic event matches with the event name of the trigger event (step S3110).

When having determined that the determination processing with respect to all the input basic events has finished (step S3109: Yes), the applied event generating unit 1605 outputs the input basic event and the generated applied event to the notification information generating unit 1606 (step S3111).

Since the basic event and the applied event are input to the notification information generating unit 1606 according to the process procedure described above, the notification information can be generated based on the condition set in the applied event management table. The process procedure is an example of a procedure since reception of an input of the basic event until an output of the input basic event and the generated applied event according to the second embodiment, and the present invention is not limited thereto.

In this embodiment, the cycle time indicating the interval of generating 'TIME_CYCLE' is one second, and the generation interval of the basic event by the basic event generating unit 1604 is also one second. However, the present invention is not limited thereto, and appropriate time is set corresponding to the needs of the application and the processing ability of the position information management server 1600. Furthermore, the retention period is not limited to three seconds.

In this embodiment, events are generated in two stages, but the present invention is not limited thereto, and events can be generated in three or more stages.

In the present invention, by providing a definition mechanism of event generation different from the definition of one-stage event generation depending on the mechanism of the position information obtaining unit, generation of events having a complicated condition, actually required by various types of applications, can be defined at a low cost.

In this embodiment, the notification destination is not limited to applications, and any destination such as devices connected via a process or a network, or a place capable of transmitting and receiving information can be set.

In this embodiment, two-stage event generation of the basic event and the applied event is performed, thereby enabling output of the notification information based on a complicated condition. Accordingly, the application that receives the notification information does not need to manage, analyze, and process the input notification information, to extract optimum pieces of information, thereby reducing the processing load.

Since only the optimum pieces of information when satisfying the two-stage conditions are notified, information not required for the application is not transmitted, thereby reducing the processing load on the application and network traffic.

Furthermore, the application developer need not create a program for executing complicated processing at the time of developing an application based on the notification information, thereby reducing the work load.

When complicated condition is to be set in one stage, it is necessary to perform complicated processing such as preparation of a macro instruction. However, in this embodiment, complicated conditions are set in two stages. Accordingly, setting of complicated conditions can be made easily.

Since the present invention provides an event generation method, which is not limited by the position information server, an advanced event processing system using notification processing of existing information can be constructed. Not only the position information management server using the active tag but also the position information management system in this embodiment can be applied, for example, to a position obtaining service using a mobile terminal, or a position information management system such as the global positioning system (GPS).

Furthermore, not only a position information manager but also an apparatus that transmits a notification according to an occurrence or a change of an event can apply the present invention. For example, the present invention can be applied to an apparatus that sets event generation conditions in two or more stages based on the information detected by a sensor or the like installed for measuring an occurrence of an event, and when these conditions are satisfied, outputs notification information.

Figure 32:
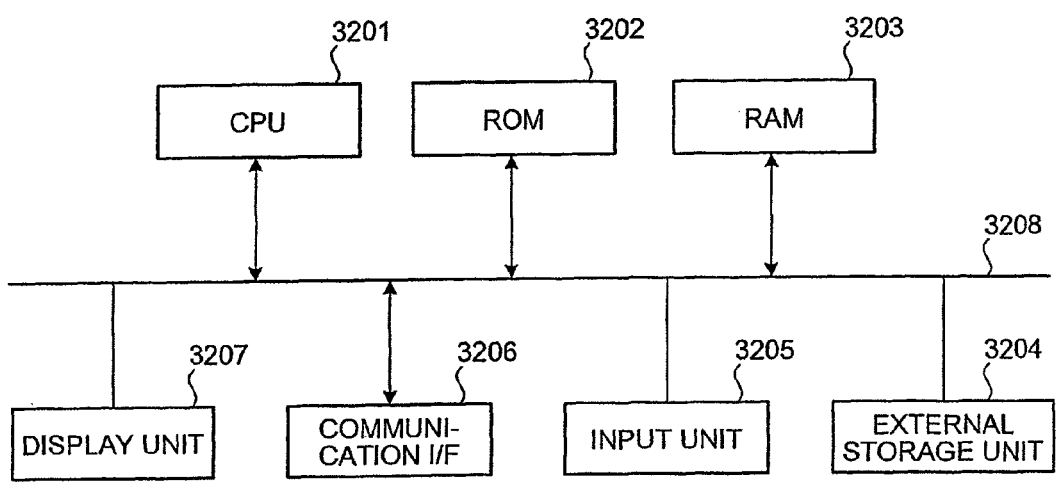
FIG. 32 depicts the hardware configuration of a personal computer (PC) that executes a program for realizing functions of the position information management server.

FIG. 32 depicts the hardware configuration of a PC that executes a program for realizing functions of the position information management server. The position information management server in this embodiment includes a manager such as a central processing unit (CPU) 3201 or the like, a storage unit such as a read only memory (ROM) 3202 and a random access memory (RAM) 3203, an external storage unit 3204 such as a hard disk drive (HDD) and a compact disk (CD) drive, a display unit 3207, a communication interface 3206 connected to the network, an input unit 3205 such as a keyboard and a mouse, and a bus 3208 for connecting these, and has a hardware configuration using a normal computer.

The notification processing program executed by the position information management server in the embodiments is recorded on a computer readable recording medium such as a CD-ROM, a flexible disk (FD), a CD recordable (CD-R), or a digital versatile disk (DVD) and provided in an installable format or an executable file format.

The notification processing program executed by the position information management server in the embodiments can be stored on a computer connected to the network such as the Internet, and provided by downloading the program via the network. The notification processing program executed by the position information management server in this embodiment can be provided or distributed via the network such as the Internet.

The notification processing program in the embodiments can be incorporated in the ROM or the like beforehand and provided.

The notification processing program executed by the position information management server in the embodiments has a module configuration including the respective units (reception processor, tag information manager, position information obtaining unit, position information change determining unit, position information DB manager, notification information generating unit, filter DB manager, and notification processor) or (reception processor, tag information manager, position information obtaining unit, basic event generating unit, applied event generating unit, notification information generating unit, notification processor, and event edit receiving unit). As the actual hardware, the CPU reads and executes the notification processing program from the recording medium, to load the respective units on the main storage unit, so that the respective units are created on the main storage unit.

Additional advantages and modifications will readily occur to those skilled in the art. Therefore, embodiments of the present invention are not limited to the specific embodiments described above. Accordingly, various modifications may be made without departing from the spirit or scope of the inventive concept as defined by the appended claims and their equivalents.

The other objects, features, and advantages of the present invention are specifically set forth in or will become apparent from the following detailed description of the invention when read in conjunction with the accompanying drawings.

What is claimed is:

1. A notification processor comprising:
a storage unit that stores event correspondence information in which event generation condition information predetermined as a condition for determining that an event to be detected has occurred is associated with target event information, which is event information indicating that the event has occurred, and is used when the event generation condition information is specified;
a first event generating unit that generates first event information, when having determined that input information matches with basic generation condition information predetermined as a condition indicating that an easily detectable event has been detected;
a second event generating unit that generates second event information, when having determined that information obtained based on the first event information matches with the event generation condition information specified based on the first event information and the target event information in the event generation correspondence information; and
a notification processing unit that transmits notification based on the second event information,
wherein, when having determined that information obtained based on one piece of the generated second event information matches with the event generation condition information specified based on the one piece of the second event information and the target event information in the event generation correspondence information, the second event generating unit generates another piece of the second event information.

2. The notification processor according to claim 1, further comprising an editing unit that performs at least one of addition, alteration and deletion of at least one of the target event information and the event generation condition information retained as the event correspondence information stored in the storage unit.

3. The notification processor according to claim 1, wherein the storage unit stores notification correspondence information in which notification event information to be compared with the second event information, notification condition information indicating a notification condition, and transmission destination information are associated with each other, and
when the notification condition information obtained based on the second event information and the notification event information matches with the information obtained based on the second event information, the notification processor notifies this fact to a transmission destination specified by the transmission destination information associated with the notification condition information.

4. The notification processor according to claim 1 further comprising a reception processor that receives predetermined information from the detector that has detected the mobile information storage medium, wherein
when having determined that information obtained based on the predetermined information matches with the basic generation condition information, the first event generating unit generates the first event information.

5. The notification processor according to claim 4, wherein a first event condition is information whether the obtained position information that is obtainable based on the predetermined information has been obtained, and when the first event condition is satisfied, the first event generating unit generates the first event information.

6. The notification processor according to claim 4, wherein the storage unit further stores position information obtained based on the predetermined information, and
when having determined that the obtained position information that is obtained based on the predetermined information matches with the basic generation condition information retained under a condition whether the position information has been updated, the first event generating unit generates the first event information.

7. The notification processor according to claim 4, wherein the storage unit further stores position information obtained based on the predetermined information, and
when having determined that the obtained position information obtained based on the predetermined information matches with the basic generation condition information retained under a condition whether the obtained position information is different from the position information, the first event generating unit generates the first event information.

8. The notification processor according to claim 4, wherein when having determined that information obtained based on the predetermined information matches with the basic generation condition information, the first event generating unit generates the first event information including obtained position information indicating a position of the mobile information storage medium obtained based on the predetermined information.

9. The notification processor according to claim 8, wherein in a case that the event generation condition information specified by the first event information and the event generation correspondence information is a condition indicating whether the position information is included in a predetermined area, the second event generating unit generates second event information, when matching of obtained information with the basic generation condition information has been determined based on the position information included in the first event information.

10. The notification processor according to claim 8, wherein in a case that the event generation condition information specified based on the first event information and the target event information in the event generation correspondence information indicates whether the position information of the mobile information storage medium is within a predetermined distance range, the second event generating unit generates the second event information when matching of obtained information with the basic generation condition information has been determined since the obtained position information included in the first event information generated by the first event generating unit is present within the distance range.

11. The notification processor according to claim 4, wherein the first event generating unit generates the first event information, when having determined that elapsed time information indicating the elapsed time after having performed previous generation processing matches with the basic generation condition information retained under a condition whether a predetermined time period has elapsed since generation of the first event information.

12. The notification processor according to claim 11, further comprising a reception processor that receives predetermined information from the detector that has detected the mobile information storage medium, wherein
when having determined that the elapsed time information matches with the basic generation condition information, the first event generating unit generates the first event information including obtained position information indicating a position of the mobile information storage medium, obtained based on the predetermined information received by the reception processor.

13. The notification processor according to claim 12, wherein in a case that the event generation condition information specified by the first event information and the event generation correspondence information indicates whether the position information is included in a predetermined area, the second event generating unit generates the second event information, when matching of the elapsed time information with the basic generation condition information is determined based on the position information included in the first event information.

14. The notification processor according to claim 12, wherein in a case that the event generation condition information specified based on the first event information and the target event information in the event generation correspondence information indicates whether pieces of the position information of a plurality of the mobile information storage media are within a predetermined distance range, the second event generating unit generates the second event information when matching of the elapsed time information with the basic generation condition information is determined since the obtained position information included in the first event information generated by the first event generating unit are present in the distance range.

15. The notification processor according to claim 1, wherein in a case that the event generation condition information specified based on the generated first event information and the target event information in the event generation correspondence information indicates whether the same first event information or the same second event information has been generated for a predetermined number of times within a predetermined period, the second event generating unit generates the second event, when matching of the elapsed time information with the basic generation condition information is determined since the same first event information has been generated for a number of times within the predetermined period.

16. The notification processor according to claim 1, wherein the storage unit stores at least one of the generated first event information and the second event information in event status information associated with a generated time, wherein
the second event generating unit associates the generated time with at least one of the input first event information and the generated second event information and adds the associated information to the event status information.

17. The notification processor according to claim 16, wherein in a case that the event generation condition information specified based on the generated first event information and the target event information indicates whether either one of the input first event information and the generated second event information is different from either one of the corresponding first event information and the second event information stored as the event status information in the storage unit, the second event generating unit generates the second event information when matching of the input information with the basic generation condition information is determined since the input first event information and the generated second event information are different from the event information recorded previously in the event status information.

* * * * *